United States Patent
Magy et al.

(10) Patent No.: US 9,996,079 B2
(45) Date of Patent: Jun. 12, 2018

(54) RADIO FREQUENCY DEVICE DETECTION AND INTERVENTION

(71) Applicant: Citadel Defense Company, San Diego, CA (US)

(72) Inventors: Daniel Magy, San Diego, CA (US); Henrik Borgstrom, Falsterbo (SE); Graham Booth, Biddulph (GB); Joao Diogo de Mesquita Piquard, London (GB)

(73) Assignee: Citadel Defense Company, San Diego, CA (US)

( * ) Notice: Subject to any disclaimer, the term of this patent is extended or adjusted under 35 U.S.C. 154(b) by 0 days. days.

(21) Appl. No.: 15/634,575

(22) Filed: Jun. 27, 2017

(65) Prior Publication Data

US 2018/0081354 A1    Mar. 22, 2018

(30) Foreign Application Priority Data

Sep. 19, 2016  (GB) .................................. 1615887.5

(51) Int. Cl.
| | | |
|---|---|---|
| *G05D 1/00* | (2006.01) | |
| *H04L 29/08* | (2006.01) | |
| *G07C 9/00* | (2006.01) | |
| *H04B 1/707* | (2011.01) | |
| *F41H 13/00* | (2006.01) | |

(52) U.S. Cl.
CPC ........... *G05D 1/0022* (2013.01); *F41H 13/00* (2013.01); *G07C 9/00111* (2013.01); *H04B 1/707* (2013.01); *H04L 67/12* (2013.01); *G07C 2209/61* (2013.01); *H04B 2201/70715* (2013.01)

(58) Field of Classification Search
CPC ... G05D 1/0022; B64C 39/024; H04W 12/08; H04W 24/08; H04W 28/0289; H04K 3/42; H04K 3/43; H05K 1/0218; G06K 9/6201; H04L 63/101; G08G 5/006; H03D 7/161
See application file for complete search history.

(56) References Cited

U.S. PATENT DOCUMENTS

| | | | |
|---|---|---|---|
| 6,839,551 B1 * | 1/2005 | Wong | H03D 7/161 |
| | | | 375/324 |
| 9,337,889 B1 | 5/2016 | Stapleford | |
| 9,412,278 B1 * | 8/2016 | Gong | H04L 63/101 |
| 2004/0264149 A1 * | 12/2004 | Carswell | H05K 1/0218 |
| | | | 361/752 |

(Continued)

FOREIGN PATENT DOCUMENTS

| | | | | |
|---|---|---|---|---|
| WO | WO-02078384 A1 * | 10/2002 | ............... | H04K 3/42 |
| WO | 2006023575 A2 | 3/2006 | | |

(Continued)

*Primary Examiner* — Yuri Kan
(74) *Attorney, Agent, or Firm* — Patterson & Sheridan LLP

(57) ABSTRACT

Systems, devices and methods are disclosed for detecting, characterizing and engaging unmanned vehicles. In one aspect, a method includes detecting an object, such as an unmanned aerial, land or aquatic vehicle that communicates using a radio control (RC) communications protocol, traveling to a zone including scanning one or more frequencies of RF signals; analyzing one or both of time and frequency information of the RF signals to characterize the detected object; and engaging the detected object as an authorized or unauthorized object in the monitored zone.

30 Claims, 11 Drawing Sheets

(56) References Cited

U.S. PATENT DOCUMENTS

| | | |
|---|---|---|
| 2008/0285628 A1 | 11/2008 | Gizis |
| 2009/0086792 A1 | 4/2009 | Nishizawa |
| 2012/0022719 A1 | 1/2012 | Matos |
| 2015/0350914 A1* | 12/2015 | Baxley .................. H04W 12/08 726/11 |
| 2016/0124071 A1 | 5/2016 | Baxley et al. |
| 2016/0214715 A1* | 7/2016 | Meffert ................. B64C 39/024 |
| 2016/0240087 A1* | 8/2016 | Kube ...................... G08G 5/006 |
| 2017/0039413 A1* | 2/2017 | Nadler ................. G06K 9/6201 |
| 2017/0092138 A1* | 3/2017 | Trundle ................ B64C 39/024 |
| 2017/0238200 A1* | 8/2017 | Orgill .................... H04W 24/08 370/252 |
| 2017/0280351 A1* | 9/2017 | Skaaksrud ........ H04W 28/0289 |

FOREIGN PATENT DOCUMENTS

| | | | |
|---|---|---|---|
| WO | 2015086700 A1 | 6/2015 | |
| WO | 2016051119 A1 | 4/2016 | |
| WO | WO-2016051119 A1 * | 4/2016 | ............... H04K 3/43 |
| WO | 2016122739 A2 | 8/2016 | |

\* cited by examiner

RADIO FREQUENCY DEVICE DETECTION AND INTERVENTION

CROSS-REFERENCE TO RELATED APPLICATIONS

This application claims priority under 35 U.S.C. § 119(a) to UK patent application No. GB1615887.5, filed on 19 Sep. 2016, the entire content of which is hereby incorporated by reference.

BACKGROUND

An unmanned or radio controlled vehicle is a machine controlled remotely by an operator using a radio transmitter that wirelessly communicates with a receiver on the vehicle to control its movements and/or other functions. Some unmanned vehicles are referred to as "drones." There are various types of drones commonly grouped by their medium of travel, such as unmanned aerial vehicles (UAVs) or aerial drones, unmanned terrestrial vehicles (UTVs) or ground drones, and unmanned marine vehicles (UMVs) or aquatic drones. Aerial drones are presently the most common type of drones in use, and may operate with varying degrees of autonomy or may be remotely piloted by a human operator. Aerial drones typically can carry various types of payloads. In some cases, drones are designed to be expendable.

SUMMARY

Disclosed herein are methods and systems for detecting drones in and around a designated area and determining authorization to permit or prohibit drones in protected zones.

In one aspect, a system for protecting a territory from unauthorized drones includes an array of wireless signal detection units positioned around a designated area forming a first zone and to detect signal transmissions from a drone flying into a second zone outside of the first zone, and to allow or prevent passage of the drone from the second zone to the first zone, where a wireless signal detection unit includes an antenna unit, a signal transmission unit, and data processing unit; and a data processing system in communication with the data processing unit of each of the wireless signal detection units to process data from the antenna unit to determine if a detected drone is authorized to fly in the first and/or second zones and to process the data to provide the data processing unit of the wireless signal detection unit with information including operations to engage the drone.

In one aspect, a method for monitoring and protecting a designated area includes detecting an object traveling to a zone including scanning one or more frequencies of one or more radio frequency (RF) signals; analyzing at least one of time and frequency information of the one or more RF signals to characterize the detected object; and engaging the detected object as an authorized or unauthorized object in the zone.

In one aspect, a system for protecting a territory from unauthorized drones includes one or more wireless signal detection units positioned around a designated area and operable to detect signal transmissions from a drone flying in a detection region included inside and/or outside the designated area, the one or more wireless signal detection units being configured to determine authorization of the drone in the designated area zone, wherein each of the one or more wireless signal detection units includes one or more antennas, a transceiver unit, and a data processing unit; and a data processing system in communication with the data processing unit of each of the one or more wireless signal detection units, the data processing system being configured to process data from the one or more antennas of the one or more wireless signal detection units to determine if a detected drone is authorized to fly in at least the designated area and to process the data to provide the respective data processing units of the one or more wireless signal detection units with information including instructions to engage the drone.

In one aspect, a method for monitoring radio control (RC) vehicles in a designated area, includes: detecting a RC vehicle traveling in a predefined zone that communicates using a RC communications protocol, the detecting including: scanning a plurality of frequencies of one or more radio frequency (RF) signals, measuring RF power in one or more frequency bands of the scanned plurality of frequencies, and generating a temporal RF signature based at least in part on the measured RF power; and analyzing at least one or both of time and frequency information of the one or more RF signals to characterize one or more features of the detected RC vehicle, the analyzing including: determining a frequency hopping scheme of the RC communications protocol used by the RC vehicle, and determining a timing and an order of the frequency hopping scheme to produce an RC signature of the RC vehicle.

In one aspect, a system to detect, characterize, and engage radio control (RC) vehicles using radio control communication signals, the system comprising: one or more receiving antennas configured to receive one or more radio frequency (RF) communication signals on a plurality of frequencies emanating from an RC vehicle in communicative range of the one or more receiving antennas; a transceiver unit in communication with the one or more arrays of antennas to pre-process the one or more received RF communication signals and to generate one or more RF output signals, the transceiver unit including one or more transceivers and a data processing unit; one or more transmit antennas configured to transmit the one or more RF output signals towards the RC vehicle; and a controller unit in communication with the transceiver unit to: (i) analyze at least one or both of time and frequency information of the one or more RF communication signals to determine a frequency hopping scheme of a RC communications protocol used by the RC vehicle and determine a timing and an order of the frequency hopping scheme to produce an RC signature of the RC vehicle;, and to (ii) engage the RC vehicle by commanding the transceiver unit to produce the one or more RF output signals in synchrony with the RC signature of the RC vehicle.

In one aspect, a computer program comprises a set of instructions, which, when executed by a computerized device, cause the computerized device to perform a method of monitoring and protecting a designated area, the method comprising: detecting an object traveling to a zone including scanning one or more frequencies of one or more radio frequency (RF) signals; analyzing at least one of time and frequency information of the one or more RF signals to characterize the detected object; and engaging the detected object as an authorized or unauthorized object in the zone.

In one aspect, a computer program comprises a set of instructions, which, when executed by a computerized device, cause the computerized device to perform a method of monitoring radio control (RC) vehicles in a designated area, the method comprising: detecting a RC vehicle traveling in a predefined zone that communicates using a RC communications protocol, the detecting including: scanning a plurality of frequencies of one or more radio frequency (RF) signals, measuring RF power in one or more frequency bands of the scanned plurality of frequencies, and generating a temporal RF signature based at least in part on the measured RF power; and analyzing at least one of time and frequency information of the one or more RF signals to characterize one or more features of the detected RC vehicle, the analyzing including: determining a frequency hopping scheme of the RC communications protocol used by the RC vehicle, and determining a timing and an order of the frequency hopping scheme to produce an RC signature of the RC vehicle.

In one aspect, an apparatus is substantially in accordance with any of the examples as described herein with reference to and illustrated by the accompanying drawings.

In one aspect, a method is substantially in accordance with any of the examples as described herein with reference to and illustrated by the accompanying drawings.

The subject matter described herein can be implemented in specific ways that provide one or more of the following features. In some implementations, the disclosed systems and methods can be implemented in an integrated defense and governance system that detects and identifies unmanned aerial, land and/or aquatic vehicles (e.g., drones) to defend one or more targets within a managed area, and intervenes if the drone is determined as unauthorized or a threat to the target. For example, the integrated system can determine the communication protocol of the detected drone, and disrupt its communications to cause the drone to divert from its intended path or to land, thereby controllably "downing" the drone. In some implementations systems for detection, characterization and intervention with aerial drones may be configured to identify drones in a monitored airspace, manage their flight permissions within a designated area, and defensibly engage drones that are deemed threats, e.g., by controllably downing or hijacking the drone, or permit authorized drones to fly in the protected area. In some implementations, the system includes modular signal detection units installed around a target (e.g., a high-risk target) providing a dynamic, automated decisioning arrangement that passively monitors areas encompassing and/or surrounding a target (e.g., an area of land, a body of water, a defined airspace, a person, a moving vehicle, and others). The system includes one or more modular data processing systems that receive data from the signal detection units pertaining to a detected drone in order to determine communication characteristics about the drone, and to engage the drone in a manner based on whether the drone is authorized or unauthorized to fly in a designated space associated with the target. The modular signal detection units can monitor the area without any disruptive Radio Frequency (RF) interference such that regular communications among other non-drone devices may operate on similar communication channels without interference. The system detects drones flying into the pre-designated area and can utilize a permissions unit to determine whether to allow or prevent passage of the drone. For example, if a particular drone is determined to have permission to enter a monitored area, then that authorized drone may be allowed to enter without intervention; but, if that drone does not have permission, the system may intervene in order to neutralize the drone (e.g., by downing or path manipulation). The system can, for example, activate an intercepting signal to selectively engage and neutralize the drone's communication frequencies thereby interrupting its operations. Simultaneously automated notifications related to the detection, identification, and/or intervention may be generated and provided to the protected area's ownership and/or security leadership. Systems and methods in accordance with the disclosed technology can be used to defend against the vulnerabilities that are exposed through growing drone access, as well as to expand the scope and realm of possibilities of drone uses, e.g., from highly integrated logistics and delivery systems, home security, public safety, real-estate development and more.

In some implementations in accordance with the present technology, systems and methods can detect, characterize and engage drones using radio control (RC) communication protocols. For example, the systems can use temporal and frequency metrics to determine which RC protocols are in use by a drone as it travels in a monitored detection area. The system can include one or more signal detection units, which can employ transceivers operable in, for example, the 433 MHz, 900 MHz, 1.3 GHz, 2.4 GHz, 4GHz, 6.2 GHz, and 5.8 GHz bands to provide monitoring capabilities for those band. Persons of skill in the art will appreciate that the aforementioned frequency bands include related frequency ranges of operation. For example, the 2.4 GHz frequency band may include operable frequencies from 2.4-2.5 GHz, the 5.8 GHz, band may include operable frequencies from 5.725-5.875 GHz, the 900 MHz band may include operable frequencies from 900-930 MHz, the 433 MHz band may include operable frequencies from 433-435 MHz, and so on. The system can use detection techniques to discover the channel set that the RC protocol is hopping through and discover the timing of this frequency hopping. By determining the drone's frequency hopping scheme, the system can disrupt the communications of the drone, e.g., by employing a low-power, low-cost RF transmitter to interfere with (e.g., talk over) the current protocol of the drone. In this manner, the system can engage the drone (e.g., take control and/or intercept) in a particular frequency band (e.g., 2.4 GHz) while staying within regulated limitations (e.g., FCC power limits) and while leaving that frequency band and other commonly used frequency bands (e.g., for 433 MHz, 900 MHz, 1.3 GHz, 4 GHz, 6.2 GHz, 5.8 GHz, and other bands) unaffected and available for other devices. In this manner, the system can effectively protect the designated target and surrounding zone while remaining compliant with regulatory standards in various jurisdictions, such as the United States, United Kingdom, and others. By way of example, in the United States, 2.4 GHz RC transmitters are subject to conditions laid out in FCC 15.247, which imposes a power limit of 20 dBm. Similar regulations exist in other countries such as Ofcom in the United Kingdom and the internationally recognized CE certification. By selectively transmitting at the same time and frequencies, the system can observe these regulations and still present sufficient signal strength to intercept the RC radio communications. In such implementations, the system provides a targeted and effective protection over the protected area without interrupting other authorized device activity in and around the protected area. Alternatively, in some implementations, the system may transmit intercepting signals at elevated power levels using specific times and frequencies that the detected RC system is using. By limiting the high-power interference signals to the particular times and frequencies, other radio systems operating in the same band (that are deemed not to present any risk) can continue to operate relatively unaffected.

DETAILED DESCRIPTION OF CERTAIN INVENTIVE EMBODIMENTS

Figure 1:
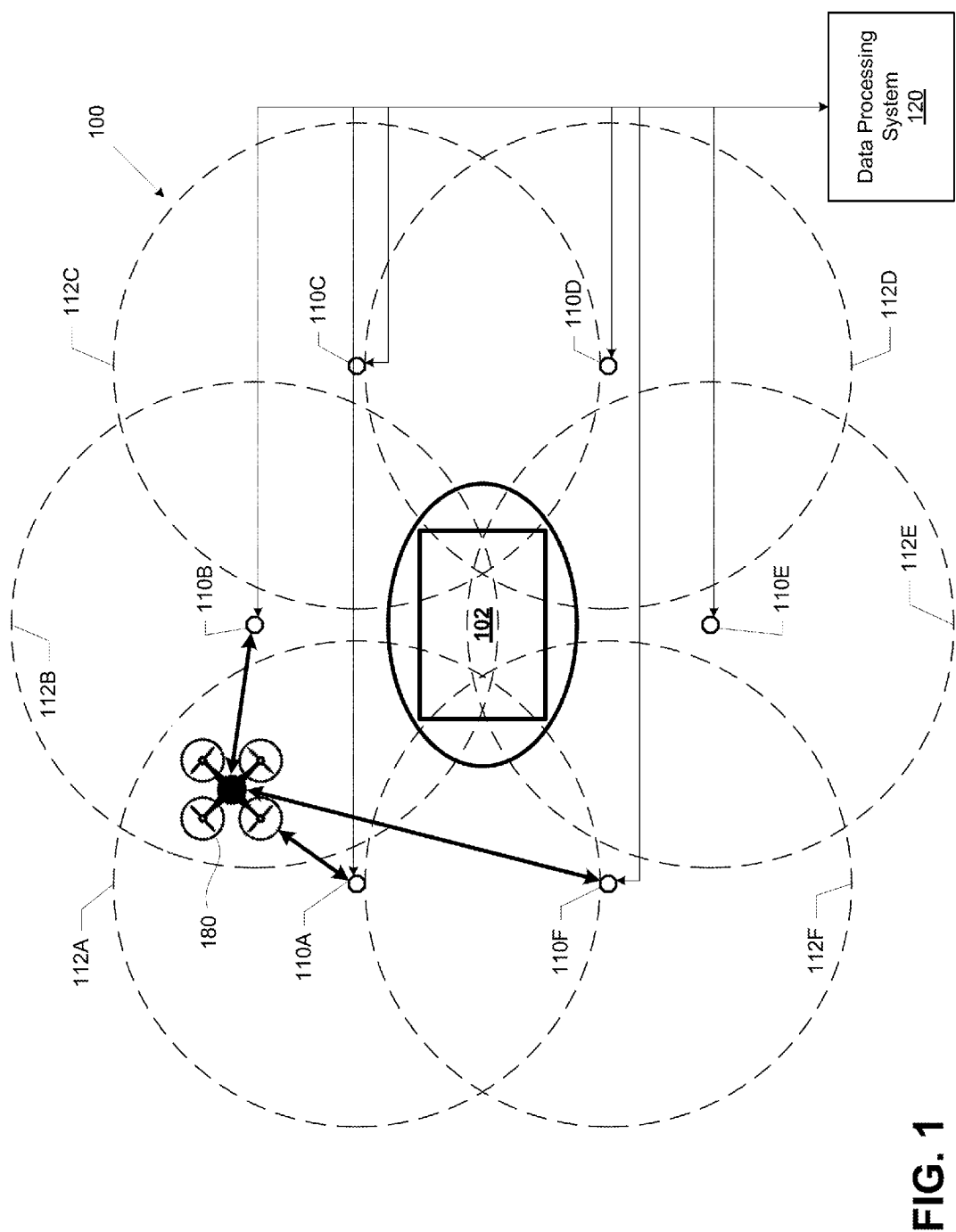
FIG. 1 depicts a block diagram of an example system to monitor and protect a territory and/or a target from unmanned vehicles such as unauthorized drones.

Unmanned vehicles of all types are increasingly available and popular with not only governmental and professional organizations, but with enthusiasts as well because of their relatively low cost and relatively high capabilities. In particular, UAVs have become widely used recently. Unfortunately, widespread access to new and capable technologies is often concomitant with the discovery of ways to exploit the new technologies for nefarious activities. UAVs, for example, provide the ability to easily trespass into private and guarded spaces, capture images and other sensory data, and deliver payloads to those spaces. As such, UAVs pose new threats to various targets when used for nefarious activities, e.g., such as invading privacy, spying, delivering illicit materials or substances such as drugs, and causing destruction by acting or deploying weapons such as a bomb. Moreover, even good-intentioned usage of drones can cause danger in areas of dense human gathering (e.g., a concert venue) or vehicle traffic (e.g., an airport).

For example, in the United States, domestic drone sales have been growing rapidly, with more than two million drone owners flying UAVs in 2015 and an estimated six million by 2017. While many local, state and federal governments have begun to at least discuss, if not implement, new regulations on drone use, there is no viable enforcement strategy to protect individuals, infrastructure, facilities and resources from potential UAV-based threats. By way of example, locations such as sporting facilities, which have ground-level security, are extremely vulnerable to aerial drones that can approach and enter the facility from generally unguarded airspace. For example, in the recent past there have been numerous reports of drones near high risk targets (HRTs) like nuclear facilities, sports stadiums, schools and airports, to name a few. And while some governments have passed laws to create "No Fly Zones" for drones, they have no tools to enforce their legislation. Also, in the United States, new guidelines are being developed and debated to require drone owners to register their drones with the Federal Aviation Administration (FAA); and similar guidelines exist in other areas of the world including the Civil Aviation Authority (CAA) in the UK and European Aviation Safety Agency (EASA) in Europe, to name a few. Yet these guidelines may only be useful in mapping and identification of a suspect drone operator after an attack, and may offer little value in preventing an attack from happening.

Notably, some drone manufacturers have recently been developing geo-fencing solutions to restrict flights into unauthorized locations, but the software can be easily modified and disabled by drone operators. But in some cases, such geo-fencing software may be defeated easily, such as by simply switching the UAV into manual flight mode.

RC vehicles can have a prescribed behavior that the vehicle enters in the case of radio failure. This behavior varies between vehicles. For traditional vehicles without GPS or any autonomous capabilities, two modes are common. The first mode is known as "Hold." In Hold mode, upon failure of the radio link, the RC vehicle will maintain all of its controls, including throttle, at the last known configuration. More commonly, the vehicle will use a "fail-safe" mode, in which the throttle is reduced to zero and all steering inputs are brought to neutral or another configuration deemed to be maximally safe.

With the use of GPS and autonomous flight in RC vehicles, new fail-safe behaviors have been enabled. For example, in some RC vehicles, there is a defined "home" location. In the case of radio failure, the RC vehicle returns to this location and lands safely. For example, another common fail-safe behavior in aerial vehicles is for the vehicle to perform a controlled landing from its current location.

The threat of drone attacks may be particularly significant from altitudes of 1,200 feet or less. For example, in the United States, the airspaces greater than 1,200 feet are regulated and protected by the FAA, Department of Homeland Security (DHS), and/or Department of Defense (DoD) as Airspace Classes A-E. However, Airspace Class G Airspace (e.g., under 1,200 feet) is presently under-regulated and unprotected with respect to drones. For example, radars are not configured to spot UAVs and in some cases not able to because drones operate with a small cross-section, at low speeds, and at low altitudes.

In one aspect of the present technology, a system for protecting a territory from unauthorized drones includes one or more wireless signal detection units and a data processing system. The one or more wireless signal detection units are positioned around a designated area and operable to detect signal transmissions from an unmanned RC vehicle flying in a detection region included inside and/or outside the designated area. A wireless signal detection unit includes one or more antennas, a transceiver unit, and a data processing unit or circuit. In some implementations, an array of the wireless signal detection units is positioned around the designated area forming a first zone, in which the wireless signal detection units detect signal transmissions from a drone flying into a second zone outside of the first zone, which can be processed to determine authorization for allowing or preventing passage of the drone from the second zone to the first zone. The data processing system is in communication with the data processing unit of the one or more wireless signal detection units to process the drone's communication signal data captured from the antenna unit(s) to determine if a detected drone is authorized to fly in at least the designated area (such as in one or both of the first and/or second zones), and to process the data to provide the data processing unit of the wireless signal detection unit with information including operations to engage the drone.

For example, when a vehicle such as a drone is moving through an airspace monitored and protected by the system, the system can detect it via its wireless signal communications such as RF, IR, Video, etc. A signal behavior or pattern of that object is tracked, which can concurrently be processed against a system database to make a determination if the object is a drone or another object. Moreover, the system can determine what type of drone is detected and/or properties of the drone and/or parameters of its travel. The system is operable to record anything that is captured and to constantly check it against the system database of known data, and in some implementations, to learn and add to the database. In some instances, for example, if the object is determined to be a drone, the system can determine if the drone is authorized to fly in the monitored and protected airspace and with what permissions. If the drone is determined not to be authorized, the system can defend the airspace (and thereby any person, place or thing inside) by apprehending the unauthorized drone, e.g., by hijacking (e.g., injecting data packets to control its flight) or downing the drone (e.g., via intercepting RF communications). In some instances, for example, if the object is unknown but fits a drone profile, it can be engaged like a drone, e.g., be neutralized.

In some implementations in accordance with the present technology, the system is designed to detect RC vehicles (e.g., aerial, land or aquatic drones) by monitoring the radio links that are used to control them. For example, in some embodiments, the system is equipped with RF transmitters that can be used by the system to intercept and/or controllably interfere with these radio links of the RC vehicles to disable the RC vehicles, thereby enforcing no-fly zones. The disclosed systems can use temporal and frequency metrics to determine which RC protocols are active by a drone as it travels in a monitored detection area. The system can include at least some of the following features in various combinations. For example, the system can include one or more directional and/or omnidirectional antennas to scan and monitor frequency band(s) used by the RC vehicles, e.g., 433 MHz, 900 MHz, 1.3 GHz, 2.4 GHz, 4 GHz, 6.2 GHz, and 5.8 GHz frequency band. The system can include RF power detection hardware to measure the RF power received by the antenna(s). The system can include one or more transceivers operable in such RC frequency bands to detect signals representative of communications by the RC vehicles on the frequency band, e.g., 433 MHz, 900 MHz, 1.3 GHz, 2.4 GHz, 4 GHz, 6.2 GHz, and 5.8 GHz. These transceivers can be configured in array or multiple arrays, and configured to intercept data and/or utilize Received Signal Strength Indication (RSSI) capabilities to measure the signal strength in particular channels. The system can include a high-speed data acquisition unit to measure and quantify the RF activity. The system can operate the one or more transceivers to transmit interference signals that disable an RC radio link of the specific RC vehicle identified based on the measured and quantified RF activity. The system can include one or more antenna elements to transmit interference signals that disable the radio link providing video or other type data to the operator.

In some implementations, the system can use detection techniques of the present technology to discover the channel set that the RC protocol is hopping through and discover the timing of this frequency hopping. By knowledge of the drone's frequency hopping scheme, the system can disrupt the communications of the drone, e.g., by employing a low-power, low-cost RF transmitter to 'talk over' the current protocol of the drone. In this manner, the system can engage the drone (e.g., take control and/or intercept) while staying within regulated limitations (e.g., FCC power limits) and leaving the rest of the communications bands unaffected and available for other devices (e.g., for 433 MHz, 900 MHz, 1.3 GHz, 2.4 GHz, 4 GHz, 6.2 GHz, and 5.8 GHz bands, other communication devices such as Wi-Fi devices are unaffected). In this manner, the system can effectively and non-intrusively protect the designated target and surrounding zone while remaining compliant with regulatory standards in essentially any jurisdiction, such as the United States, United Kingdom, and other countries. By way of example, in the United States, 2.4 GHz RC transmitters are subject to conditions laid out in FCC 15.247, which imposes a power limit of 20 dBm. Similar regulations exist in other countries such as Ofcom in the United Kingdom and the internationally recognized CE certification. By selectively transmitting at the same time and frequencies, the system can observe these regulations and still present sufficient signal strength to intercept the RC radio communications. In such implementations, the system provides a targeted and effective no-fly protection over the protected area without interrupting any device activity. Alternatively, in some implementations, for example, the system may, under certain circumstances, transmit intercepting signals at highly elevated power levels, e.g., which can be at the specific times and frequencies that the detected RC system is using. By limiting the high-power interference signals to the particular times and frequencies, other radio systems operating in the same band (that are deemed not to present any risk) can continue to operate relatively unaffected.

Some embodiments of system leverage low-cost 433 MHz, 900 MHz, 1.3 GHz, 2.4 GHz, 4 GHz, 6.2 GHz, and 5.8 GHz transceivers (e.g., which may be configured in parallel) to be amenable to low-cost production and large-scale integration in various environments, e.g., such as an urban grid in residential and/or commercial settings. Some embodiments of system use high frequency data acquisition units and dedicated computing hardware to provide high fidelity radio system characterization that may be better suited for higher cost applications, e.g., such as military, homeland security, or large infrastructure.

A significant and growing percentage of today's and tomorrow's drones are controlled via radio controlled (RC) communication systems. An RC system typically includes (i) a transmitting control unit, which may include a handheld control unit operated by an operator, to transmit control and/or control support signals to and receive return signals from the vehicle, such as a drone which may be aerial, terrestrial, or aquatic, and (ii) a receiving unit attached or integrated in the vehicle to direct movements and/or other operations of the vehicle based on the received signals from the transmitting control unit. The transmitting control unit can include a number of interface control components, such as switches, potentiometers, and push-buttons, a microcontroller or other computing hardware which measures inputs from these controls and generates a data packet to provide the control and/or control support signals, and a radio transceiver which generates/transmits a radio packet containing this data. The receiving unit can include a receiver (or radio transceiver), located on the vehicle, which receives the radio packet and decodes it into a digital packet, a microcontroller that receives these digital packets and creates commands to other hardware of the receiver unit to implement the control instructions in the digital packet, and actuators that generate the desired mechanical changes on the vehicle, e.g., such as deflection of servo motors or throttle adjustments.

In addition to this flow of data and control from the control unit (e.g., such as a handheld unit operated by an operator) to the vehicle, many modern RC vehicles include additional equipment. For example, RC vehicles can be equipped with cameras or other imaging equipment that generate images or video from the vehicles point of view, radios which transmit this video data back to a receiver carried by the operator, and/or a screen, goggles, or other device(s) which displays the video or images to the operator. Such a system for RC vehicles provides a user with first-person view (FPV) capabilities, in which the user is effectively able to "see" from the point of view of the vehicle.

FPV-enabled vehicles have recently been widely adopted for a number of uses, including video coverage, surveillance, package delivery, and as a hobby. However, their use is widely unregulated, and there is concern that FPV RC vehicles may be used for more nefarious purposes, such as delivery of illegal materials, acts of terror, warfare, and espionage, or that operators may unintentionally operate such vehicles in dangerous or sensitive regions, thereby unwittingly posing a security threat.

System Overview

FIG. 1 depicts a block diagram of an example system 100 to monitor and protect a territory and/or a target from unmanned vehicles such as unauthorized drone 180, thereby providing an invisible boundary around a designated area. System 100 includes an array of detection units 110A-110F positioned around a potential target 102 (e.g., such as a venue or site, like a stadium, building, park, monument, open air theatre, established or make-shift gathering area, etc.) in order to create a first boundary zone (e.g., a zone defined as the interior of the polygon formed by connecting lines between detection units 110A-110F). The detection units 110A-110F are configured to monitor communication signals by unmanned vehicles that enter a second boundary zone, outside the first boundary zone. While six detection units 110A-110F are shown in FIG. 1, different numbers of detection units may be configured in the system 100 and arranged about the designated area in different ways. The detection units 110 may be configured to scan for signals produced by the unmanned vehicles in one or both of the first boundary zone and the second boundary zone.

System 100 is operable to detect unmanned vehicles (e.g., drones) in the second boundary zone outside of the first boundary zone. For example, the detection units 110 can send a detection signal to an unidentified drone flying into this second boundary zone to communicatively engage the drone and to determine if it is authorized or unauthorized to be in the first and/or the second boundary zones. In some implementations, the system 100 is operable to transmit an intervening communication signal to the drone to seize control or disable operations of the drone, e.g., to protect a designated area. In some implementations, system 100 can be used for defense of a high value target, such as a stadium, arena, public gathering (e.g., such as a speech, concert, inauguration, etc.), skyscraper, or others.

The detection units 110 may include one or more antennas, one or more transceiver units, and one or more data processing units or circuits. The data processing unit or circuit of a detection unit 110 is configured to be in communication with the antenna(s) and transceiver unit to control the operation of the antenna(s) and transceiver unit. In some implementations, the data processing unit is configured to receive and process data retrieved by the communication antennas, e.g., such as perform signal conditioning, prior to transmission by the transceiver unit. In some embodiments, the data processing unit of the detection unit 110 can include a processor to process data, a memory to store data, an input/output module to receive and send data to/from the data processing unit, and/or a signal processing circuit to amplify the communications antennas and/or sensors of the detection unit 110.

In some embodiments, the detection units 110 can further include light emitter (e.g., visible lighting and/or lasers) and/or audio speakers disposed on the detection unit at its respective position around the designated area. In some embodiments, for example, the detection units 110 can include various types of sensors (e.g., radar, optical sensors, audio sensors, etc.) to detect the presence of aerial vehicles. In some embodiments, for example, the array of detection units 110 can include a weapons system. In some implementations, for example, the detection units 110 can include a tower structure to hold the communication antennas, light emitters, and/or audio speakers in an elevated position of the detection unit. Whereas in some implementations, the detection units 110 can be mounted or attached to existing structures such as buildings, posts, etc. In some embodiments of the detection units 110, the data processing unit is configured in communication with the light emitters and/or audio speakers to control the operation of the light emitters and/or audio speakers, and to process data retrieved by the light emitters and/or audio speakers.

System 100 includes a data processing system 120 in communication with each of the detection units 110A-110F (e.g., via the data processing units of the detection units) to provide and to receive data for characterization and/or engagement of unmanned vehicles by the system 100. The data processing system may include a processor to process the data such as the communication signal data detected by the detection units 110, and a memory in communication with the processor to store the data. The data processing system may also include a communications unit, e.g., such as a wired or wireless communications module, to transmit and receive the data to and from the data processing units of detection units 110. In some embodiments, for example, the data processing system may be implemented on a user device including at least one of a laptop or desktop computer, smartphone, tablet, or wearable device by a graphical user interface of an application that interacts with or operates the device.

In some implementations, for example, the system 100 can be configured to scan and process signals at the frequencies used in radio control communications, e.g., such as 2.4 GHz. In such implementations, the system can include 2.4 GHz receivers (e.g., which can be 2.4 GHz transceivers) used to measure power in 2.4 GHz band. The power level is sampled, and the time signature is compared against time signatures of known protocols. In some implementations, the signal can be sampled at kHz rate, rather than GHz rate, decreasing cost and complexity. Matched filtering can be used to find underlying RF time signature in presence of noise.

In some implementations, the data processing system 120 analyzes the detected RF communication signal data provided by the detection unit(s) 110. The data processing system determines time and frequency information of the RF signals to characterize the detected object, e.g., discovering the channel set that the RC protocol is hopping through and discover the timing of this frequency hopping. For example, data processing system 120 determines a timing and an order of the frequency hopping scheme to produce an RC signature of the object. In some implementations, the data processing system 120 compares the RC signature of the object to known RC protocols (e.g., stored in the memory of the data processing system 120, and/or by accessing remote databases/systems) to determine the RC communications protocol of the detected object to produce the characterization.

By knowledge of the drone's frequency hopping scheme, the system 100 can engage the object using the intervening signal in synchrony with the object's RC communication to disrupt its communications, which can be implemented by employing a low-power, low-cost RF transmitter of the detection unit(s) 110 to 'talk over' the current protocol of the object. In this manner, the system 100 can engage a drone (e.g., take control and/or intercept) while staying within regulated communications limitations (e.g., power limits), and thereby not interrupting the communications bands available for other devices (e.g., such that communication devices such as Wi-Fi devices are unaffected).

In some implementations, for example, the system 100 can be operated to deploy the intervening communication signal to the drone, e.g., at a range of 0-500 meters from a detection unit 110 of the system 100. The system 100 can be configured such that the designated area is within the first boundary zone 101, and/or at or even beyond the first boundary zone 101 but in the range of the intervening communication signals of the detection units 110. In some embodiments, for example, the system 100 can include a secondary array of detection units located at the designated area.

The array of detection units 110 are operable to detect the drone by at least one of a variety of different techniques, e.g., including motion detection and wireless communication protocols using radio frequency, Bluetooth (e.g., including low energy Bluetooth or BLE), or other communication methods with a drone that is able to identify a drone in motion within the zones of the invisible boundary. For example, the system 100 can have the antennas of the detection units 110 track a detected drone's movements, and to engage the drone in a manner that can disable the drone or to seize control of (e.g., 'hijack') the drone to send it away or to a specific location under the control of the system. In one example, the system 100 can lock on and overwhelm the communications system of the drone by transmitting the radio, optical, or electromagnetic signal at the drone to cause the drone to down, without physically knocking it down. Whereas, in other examples, the system 100 can lock on to the drone and physically disable the drone by sending a weapon at the drone (e.g., missile).

For example, when locked on and engaged with the drone, the system 100 can perform a set protocol of frequencies to try and establish communication with the drone. By running through a variety of frequencies quickly, this gives the drone (e.g., its operator) a chance to divert the flight of the drone away from the protected zones and designated area. If communications cannot be established, or if the drone continues to fly into the zones 102 and 101 unauthorized, then the system 100 can attack the drone to disrupt the drone's ability to communicate with its own operator and to set the drone's course away from the established perimeter. For example, the system 100 can control or disrupt communications of drone in that is being manned either manually or automatic. For example, manual communication disruption can include manipulating via radio manual control. For example, disruption of automatic control can be through the manipulation of GPS and/or sensor (e.g., video, light, etc.). For example, as a primary or secondary action, the drone can be knocked down through electromagnetic pulse (EMP) or similar disruption in its manual or automatic commination.

The disclosed technology can provide a defensive perimeter through the following framework. In some implementations, for example, drones can be authorized to fly in certain zones or subzones or along certain pathways of the perimeter. Each drone can be assigned a unique ID, e.g., prior to entry (or in some implementations, upon entry when such drone has been properly vetted by the data processing system 120). For example, if the drone is registered, then the drone can enter the airspace; and if not register, it cannot enter. For example, the registered drones can be instructed to operate (e.g., maneuver) in a predetermined or specified manner with the system, e.g., such as all drones to use the same frequency if they want to enter the airspace controlled by the system, e.g., such that the system way we can override commands if they disobey.

In some implementations, for example, the system 100 can assign token ID or use Block-chain as a way to give permissions and determine where drones can and cannot go. In implementations using block chain, for example, the system can create a public ledger and track movements of drones. For example, the system 100 can use the block chain or tokens to reconcile against drone history and records, can assign levels of drone credibility, and assign threat or friendly levels accordingly. Certain levels of attention can be assigned to drones with no history of permissions in that area. The disclosed technology can include levels of redundancies of actions from manual to automatic that manipulate or control drones as needed, e.g., which can depend on level of intrusion.

For example, the block chain and credential system can be used to check which drones have been a part of the system, which geo-fences they have been approved for, etc. From this, for example, correlations can be created quicker and also match the right response based on statistical correlation and credibility. For example, the geo-fences can disrupt the drones by GPS, e.g., as drone automations may come from GPS or some kind of sensor points.

In various implementations of system 100, such as in an urban setting, for example, detection units 110A-110F can be placed on top of buildings, signs, traffic signals, or other structures to form an unobtrusive perimeter around the designated area. System 100 has a modular architecture that allows the detection units 110 to be positioned and operate to meet the needs of the localized zones the system 100 is operable to protect. For example, the data processing system can be located within one of the protected boundary zones or outside the zones in a remote location. Also, for example, the detection units 110 can be arranged to create any shaped zone or set of zones, or arranged to create a wall of the zones, e.g., such as arranged along a national border or other noncontiguous boundary.

Figure 2:
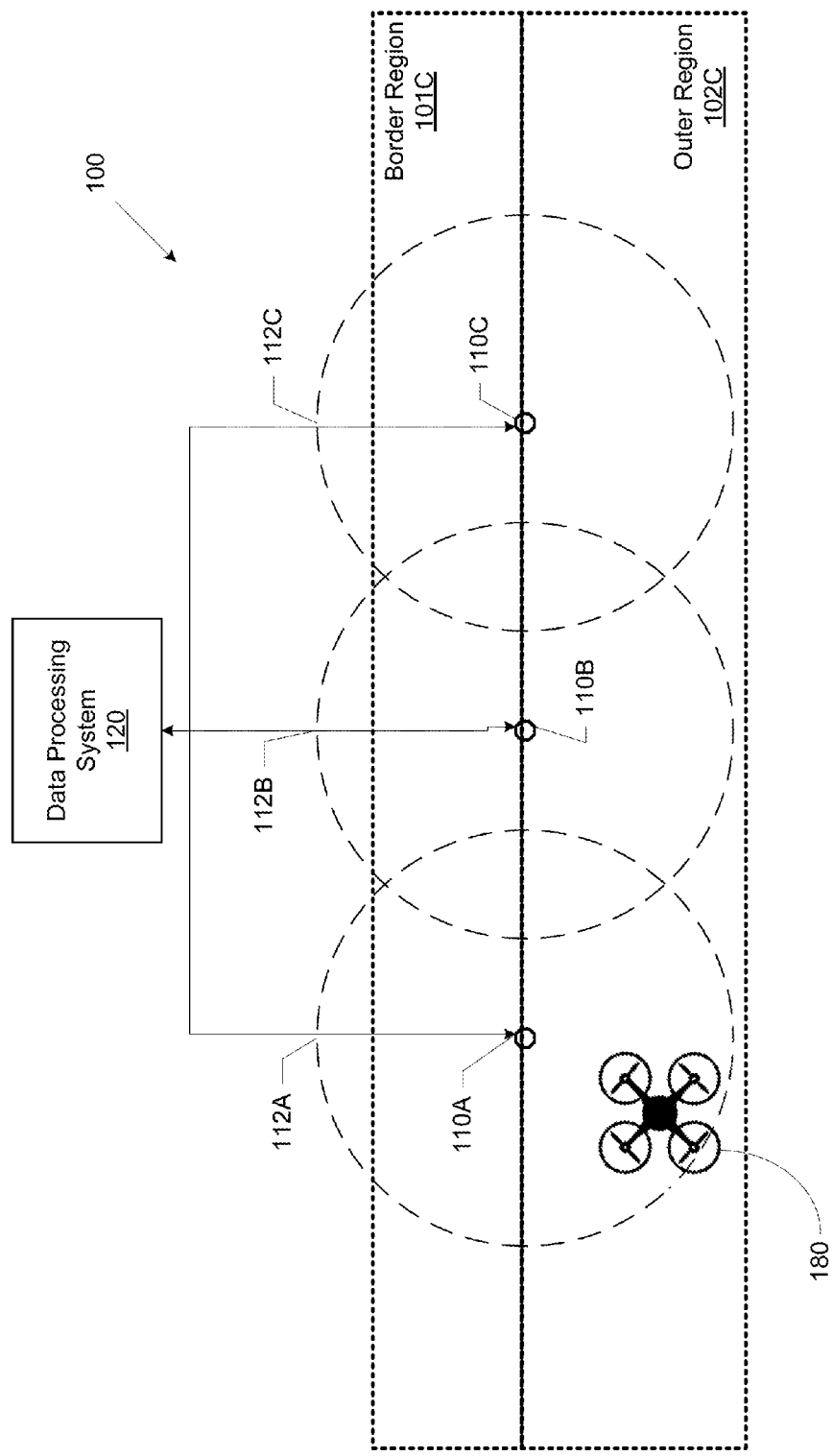
FIG. 2 depicts a block diagram of another example embodiment of the system arranged about a border region.

FIG. 2 depicts a block diagram of another example embodiment of the system 100 arranged about a border region 101C to monitor and protect the border (e.g., which can include one or more specific targets or sites within or beyond the border region) from unmanned vehicles such as unauthorized drone 180, thereby providing an invisible boundary around a designated area. As shown in FIG. 2, the system 100 includes an array of detection units 110A-110C positioned along the border region 101C proximate to an outer region 102C to monitor and protect the border region 101C from unmanned vehicles traveling in the outer region 102C and/or the region 101C. FIG. 2 depicts another example of the multitude of arrangements that the detection units 110 can be configured. In this example, communication detection zones monitored by each respective detection unit 110 can align and/or overlap to create a contiguous border region 101C.

Figure 3:
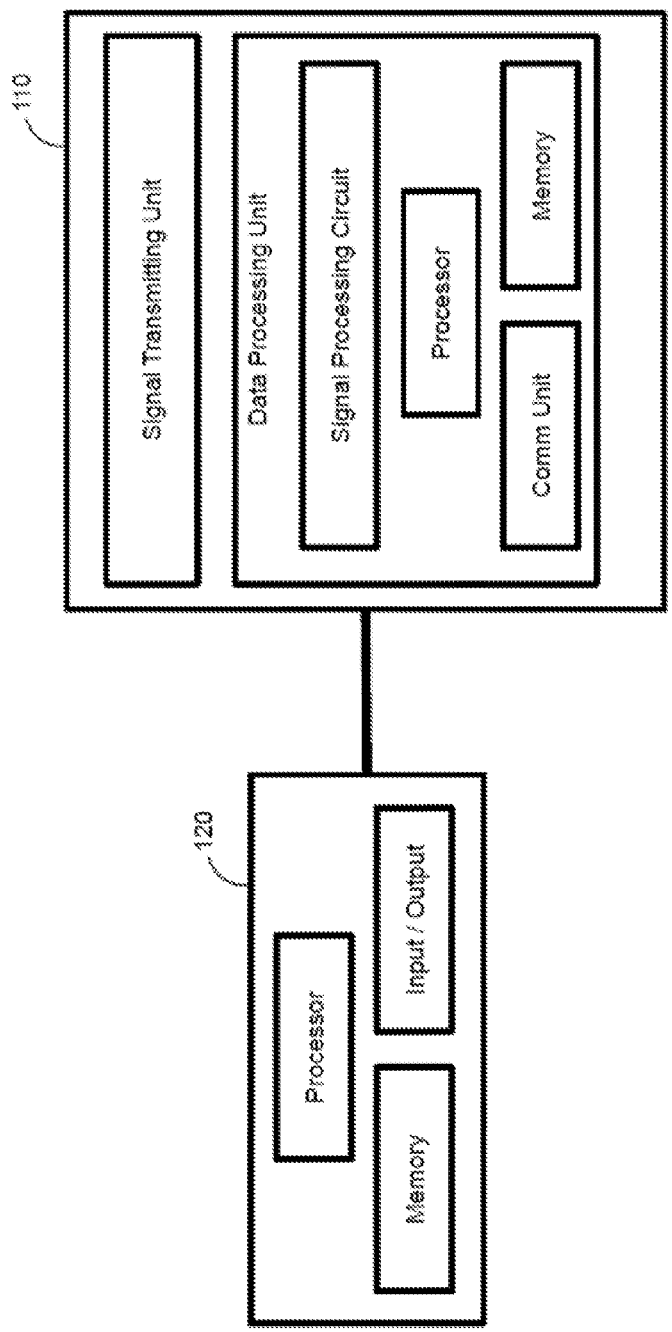
FIG. 3 depicts a block diagram of an example data processing system in communication with a data processing unit of an example detection unit.

FIG. 3 depicts a block diagram of an example data processing system 120 in communication with a data processing unit of an example detection unit 110, such as those depicted and described with respect to FIGS. 1 and 2.

In some embodiments, the detection unit 110 includes a signal processing circuit to condition data signals between the signal transmission unit and the processor, memory, and/or communications unit of the detection unit. For example, the signal processing circuit can include an analog-to-digital converter and/or a digital-to-analog converter. For example, digitized signals or data are provided to the processor and memory of the data processing unit to process and store data.

In some embodiments, the data processing system 120 includes a processor such as a central processing unit (CPU) to process data and a memory in communication with the central processing unit to store data. The data processing system 120 includes an input/output (I/O) unit in communication with the central processing unit that provides a wired and/or wireless communication interface or interfaces compatible with data communication standards for communication of the data processing system 120 with other communication devices, e.g., including the detection units 110, computers and computer systems, or external interfaces, sources of data storage, or display devices, among others. For example, the data processing system 120 can be in communication with other computer devices via the Internet. The memory unit includes processor-executable code, which when executed by the central processing unit, configures the data processing system 120 to perform operations to determine if a detected unmanned vehicle is authorized to fly in the first zone and/or second zone and to process the detection data to provide the data processing unit of the detection unit 110 with information including instructions to engage the unmanned vehicle; and to perform other various operations, such as receiving information, commands, and/or data, processing information and data, and transmitting or providing information/data to another entity or to a user. The I/O unit can provide wired or wireless communications using one or more of the following communications standards, e.g., including, but not limited to, Universal Serial Bus (USB), IEEE 1394 (Firewire), Bluetooth, Bluetooth low energy (BLE), ZigBee, IEEE 802.11 (Wi-Fi), Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/5G/LTE cellular communication methods, and parallel interfaces, among others.

Figure 4:
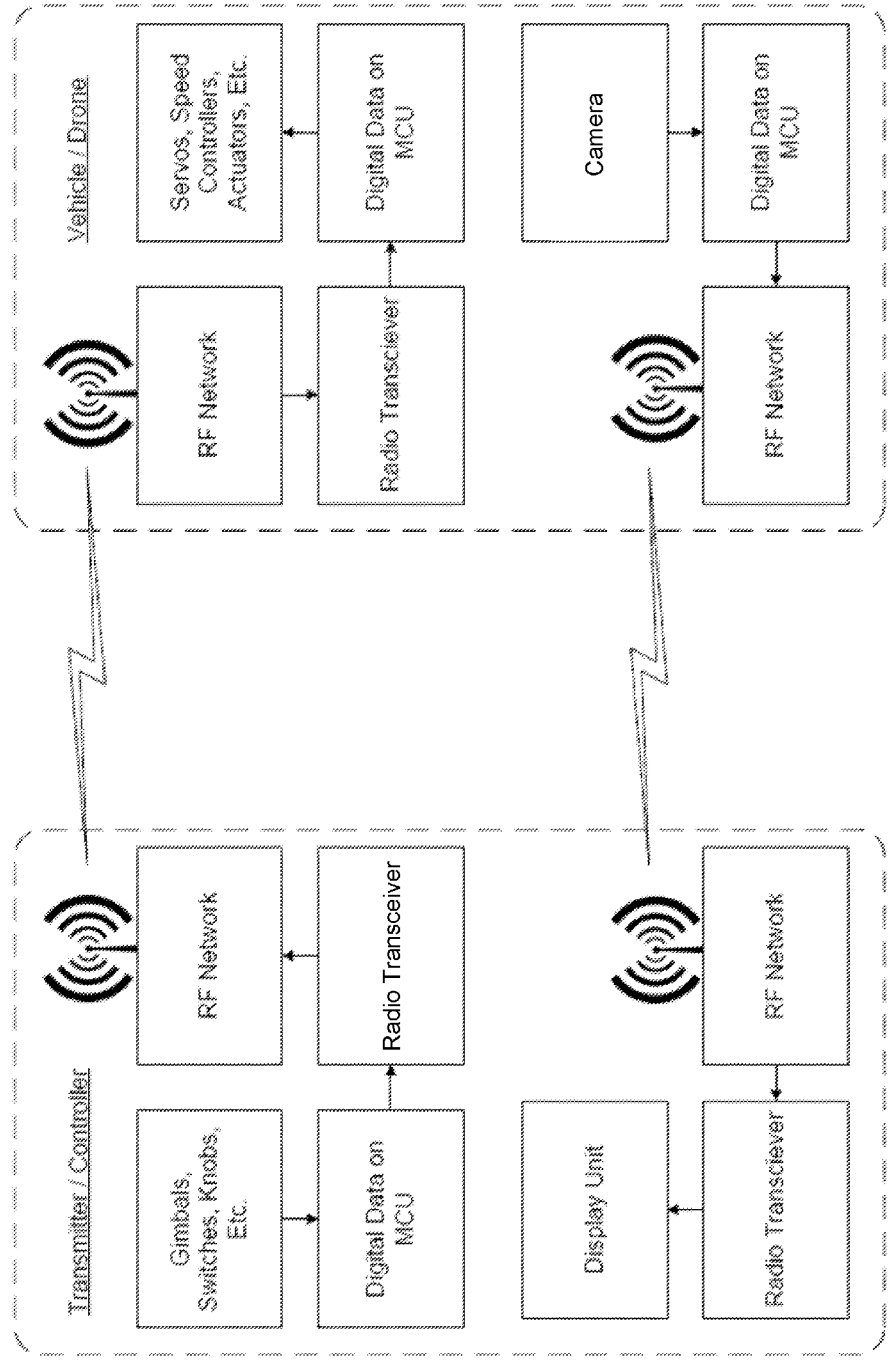
FIG. 4 depicts a diagram of an example data flow in FPV-enabled radio controlled vehicles.

FIG. 4 depicts a diagram of an example data flow in FPV-enabled radio controlled vehicles. For example, as depicted in the figure, an operator can use a hand-held transmitter/controller with gimbals, switches, knobs or other controls, which are subsequently converted to digital data on the transmitter MCU using analog-to-digital converters (ADCs). This data is communicated to a radio transceiver, which generates radio packets that are transmitted to an antenna via an RF network according to a prescribed radio protocol. The resulting RF energy is received by an antenna on the vehicle and arrives at a radio transceiver via an RF network. The radio transceiver generates digital data, which is communicated to the MCU, which, in turn, generates the desired changes on a set of end-effectors such as servo motors and speed controllers. An RC vehicle that is FPV enabled can also be equipped with an imager or video camera. For example, the MCU receives images or data from the camera and transmits it using a radio transceiver and antenna. A radio transceiver and antenna on or near the transmitter can receive this transmission and generate a video feed on a video display, thereby providing the operator with a live video feed from the point of view of the vehicle.

Traditionally, radio control (RC) vehicles were controlled via analog radio systems typically operating near 70 MHz. Due to a large number of shortcomings associated with these radio systems, e.g., in particular the inability of several radios to share a channel, newer RC vehicles may use the 433 MHz, 900 MHz, 1.3 GHz, 2.4 GHz, 6.2 GHz, 5.8 GHz and other frequency spectrums for improved performance and capability. Such radio links leverage two transceivers, one in the controller (e.g., also referred to as the transmitter), and a second in the receiving unit (e.g., referred to as the receiver) located on the vehicle. The radio traffic is largely one-way, with most of the traffic occurring from the transmitter to the receiver; although some systems provide limited communication back to the transmitter, which may include telemetry data or information about the integrity of radio link.

These RC radio systems are starkly different from the more widespread Wi-Fi protocol that coexists in, for example, the 2.4 GHz band. Wi-Fi is designed to support maximally robust data transfer with hand-shaking, acknowledgement schemes, and spread spectrum transmissions. These techniques for Wi-Fi are effective at accomplishing these objectives, but there is an associated latency and jitter in the timing of data delivery. Radio control systems have vastly different needs. For example, in RC systems, intermittent packet loss is of relatively little concern, as long as subsequent packets arrive intact. However, RC is a latency-intolerant application, as skilled operators can detect delayed vehicle response caused by latencies as low as 11 ms. Further, large numbers of RC vehicles are often operated in close proximity, and RC radio systems must be agile and robust to the resulting interference.

Due to the different nature of the RC application, digital radio systems geared toward this purpose have evolved characteristics quite different from Wi-Fi and other 2.4 GHz radio systems. In one example for RC systems, the transmitter generates radio packets at evenly spaced intervals, e.g., typically 7-22 ms. For example, these are transmitted in short bursts of duration, e.g., 1-2 ms. In between consecutive transmissions, the transmitter will typically hop to a new frequency. This frequency-hopping behavior ensures robustness, as poor signal quality on one frequency may not affect the next frequency, thereby allowing for successful transmission.

Figure 5A:
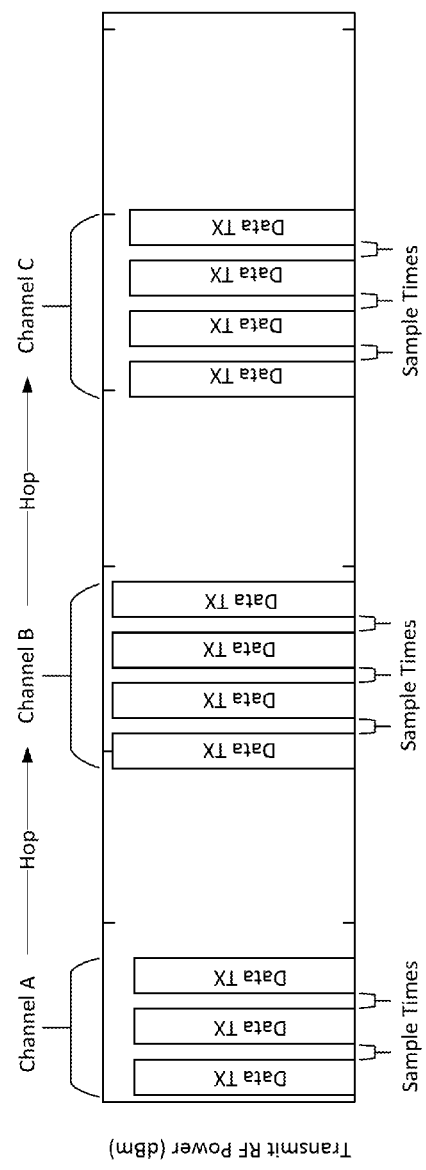
FIG. 5A depicts a radio protocol timing plot depicting the time between data sampling by analog-to-digital converter(s) (ADC) of an RC vehicle allocated for data transmissions.

FIG. 5A depicts a radio protocol timing plot depicting the time between data sampling by analog-to-digital converter(s) (ADC) of an RC vehicle allocated for data transmissions. Data samples from ADCs are sampled a regular interval, e.g., such as 50 Hz, in which case the servo period is 20 ms. After ADC sampling, the transmitter has 20 ms to transmit the data. After the servo period elapses, the transmitter abandons its efforts, receives new data, and repeats.

Figure 5B:
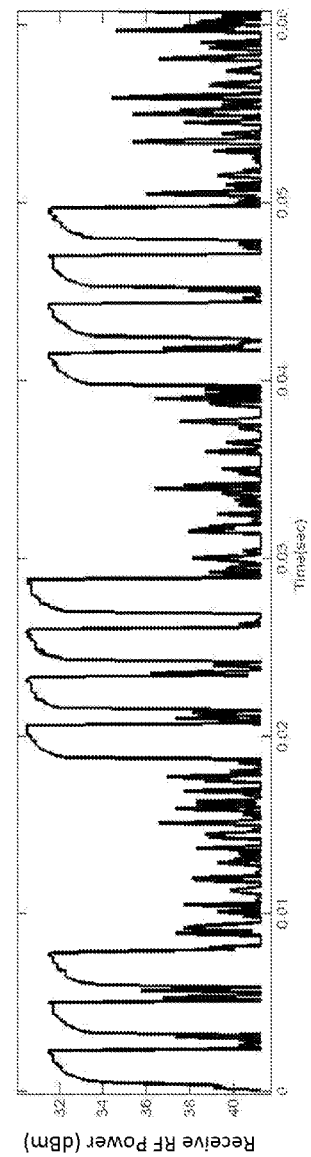
FIG. 5B depicts an RF signature of an example radio control protocol.

FIG. 5A also depicts a channel hopping scheme used in radio controlled systems. As depicted, transmissions occur in brief bursts, and the radio control system may hop to a new channel after each transmission. In addition to frequency hopping, some RC radio systems use Direct Sequence Spread Spectrum (DSSS) or Code Division Multiple Access (CDMA) to further improve robustness. For example, in a DSSS-based RC radio system, each transmitted bit is convolved with a particular sequence of bits (e.g., known as a chipping code) before transmission. The receiver is provided with the chipping code during pairing and is able to use this code to successfully receive packets at lower signal-to-noise ratio (SNR) than otherwise possible. This increase in robustness is known as coding gain. FIG. 5B depicts an RF signature of an example radio control protocol (as depicted in FIG. 5A) shown with actual RF power measurement.

Figure 6:
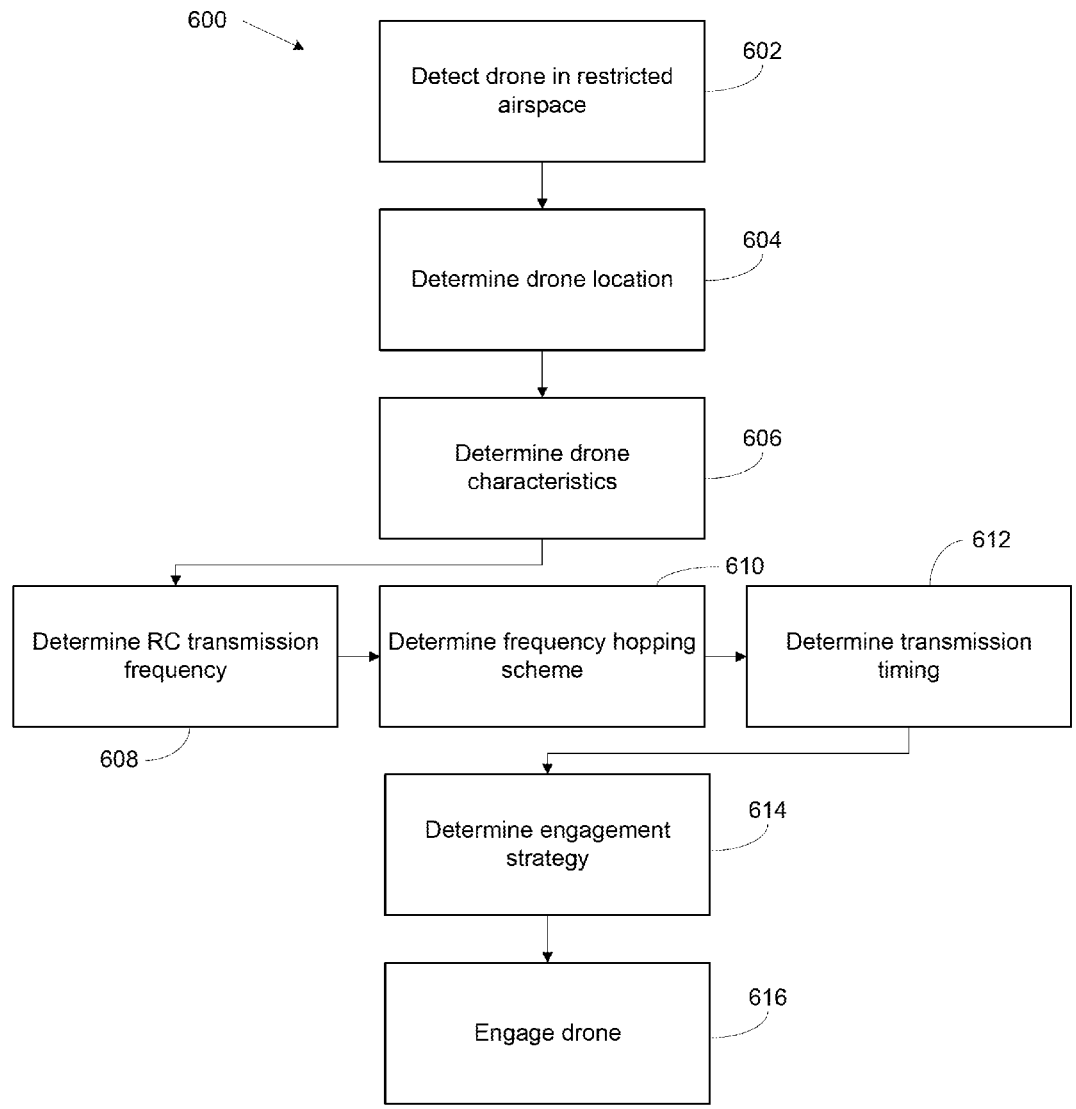
FIG. 6 depicts an example method performed by a system configured to detect unauthorized unmanned aerial vehicles and protect a designated area.

FIG. 6 depicts an example method 600 performed by a system configured to detect unauthorized unmanned aerial vehicles and protect a designated area, such as system 100 described with reference to FIG. 1.

The method begins at step 602 by detecting a drone in a restricted airspace. For example, one or more zones by the array of detection units 110 could scan an airspace to detect if a drone has entered a particular zone and generating detection data. In some embodiments, the drone can be detected by motion/signal/lights via the antenna system of the detection unit 110.

The method then moves to step 604 where the drone location is determined. For example, the drone location could be determined using triangulation of received signals from one or more detection units 110, such as shown in FIG. 1.

The method then moves to step 606 where drone characteristics are determined. For example, at step 608 the drone's RC transmission frequency may be determined. Thereafter, at step 610, the drone's frequency hopping scheme may be determined. Then at step 612 the drone's data transmission timing may be determined. These drone characteristics and others may be communicated determined by the data processing system 120 in order to assess a potential threat from the drone. Notably, in some embodiments, only a subset of the aforementioned drone characteristics may be determined. In some embodiments, other drone characteristics may be determined.

The method then moves to step 614 where an engagement strategy is determined. For example, the system 100 can then check the drone ID data against to determine if the ID is OK (i.e., the drone is authorized) or not OK (i.e., the drone is unauthorized) to access the particular zones that the drone is flying toward, proximate, or in. Additionally, or alternatively, for example, the system 100 can receive a code (e.g., a token) from the drone traveling in the detected area. For example, the code may have been provided by the system 100 in advance to indicate the drone is authorized to travel in the zone.

If at step 614 it is determined that the drone is authorized to enter an area, then the system 100 can permit the drone to continue along its flight course (i.e., no engagement). If the drone is not authorized to enter an area, then the system 100 may engage the drone.

For example, in step 616 the drone may be engaged. In some embodiments, the system 100 can implement pre-established protocols to send the signals that can disrupt the drone's operations. For example, such signals can may interfere with the drone's ability to fly, may cause the drone to fly away from the protected zone (e.g., returning to home), may cause the drone to land, or the like. In other implementations, may physically attack the drone, for example, by using directed energy (e.g., laser), kinetic (e.g., bullet), explosive (e.g., missile) or other means.

Example RC Vehicle Detection, Characterization, and Engagement Methods

In implementations where the unmanned vehicle or drone is operating using RC communication signals, the systems and methods in accordance with the present technology can characterize the RC protocol in use based on a certain set of properties in the time and frequency domain. In the time domain, an example system can detect pulses of RF energy transmitted by the RC drone during its travel and operations. For example, as described above with reference to FIGS. 5A and 5B, the RF energy may have a length 2 ms occurring at intervals of 20 ms for one RC protocol and of length 1 ms at intervals of 11 ms for another. The system can detect and analyze these pulse sequences to determine if an RC protocol is currently active and, in many cases, determine which protocol it is (e.g., determine the protocol associated with a particular manufacturer and/or series or model of the drone). Similarly, for example, each protocol is typically defined by certain characteristics in the frequency domain. For example, the drone's communications transmissions may jump through a set of 15 channels, or maybe through a set of 20. The channels can be statically assigned (e.g., not change after initialization), or they may change during use to avoid noisy channels. The system can detect and analyze the frequency characteristics of the drone and determine its frequency hopping scheme.

Figure 7:
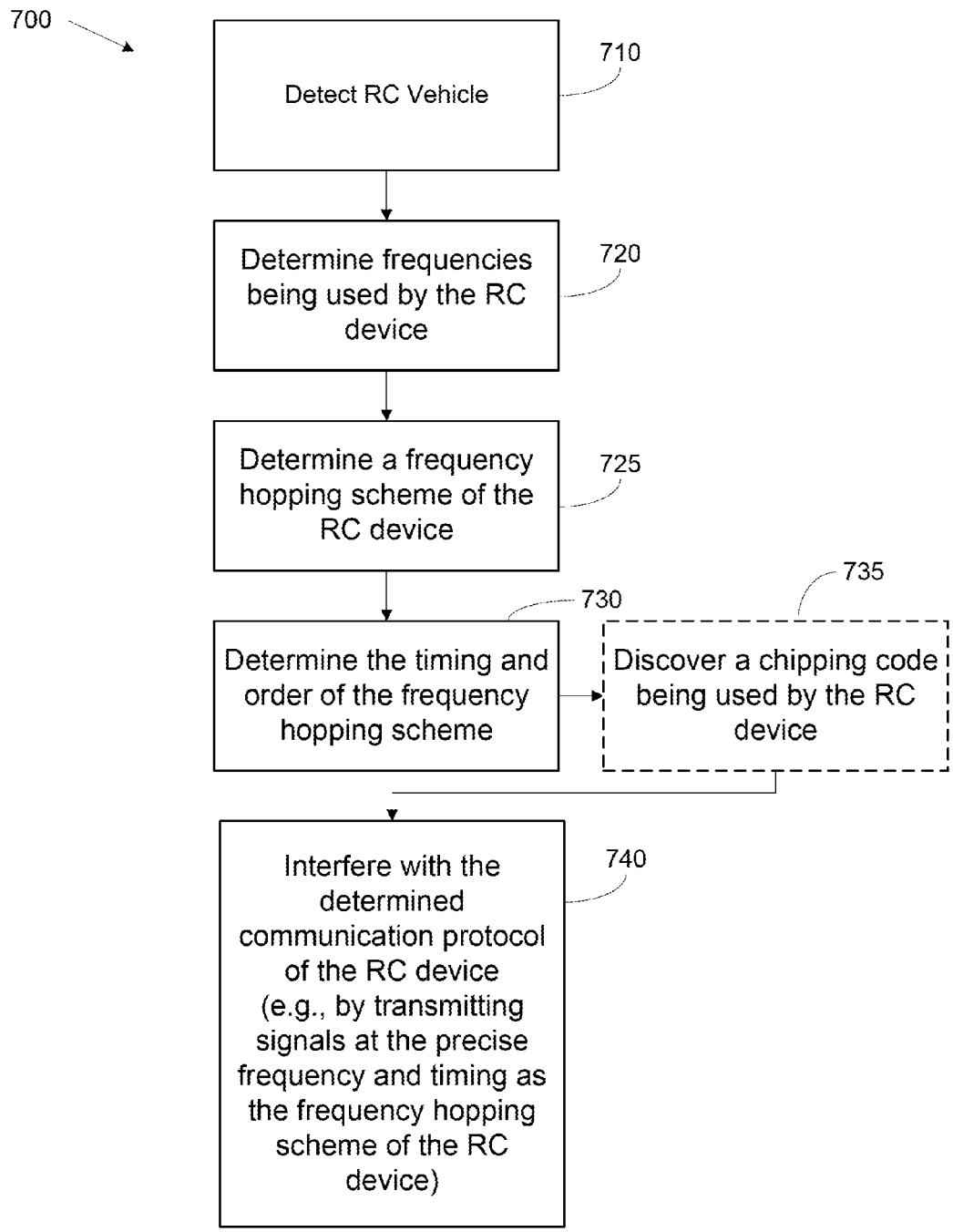
FIG. 7 depicts an example method to detect, characterize, and engage unmanned vehicles operating using radio control communication signals.

FIG. 7 depicts an example method 700 to detect, characterize, and engage unmanned vehicles operating using radio control communication signals, e.g., which may be referred to as RC vehicles or drones. The method 700 can be implemented by the system 100 (as described with reference to FIG. 1) and other example embodiments of the unmanned vehicle detection systems in accordance with the present disclosure. In some implementations, the method 700 can be implemented to selectively interfere with RC radio operations of particular drones detected and characterized (e.g., identified and determined unauthorized) in a designated zone, e.g., by the radio link of the drone.

The method 700 begins at step 710 one or several RC devices, e.g., drones operating by an RC protocol, are detected (potentially in the presence of significant RF noise).

As an example, in some implementations of step 710 to detect RC radio systems (e.g., RC drones) by their radio links, detection of RC radio link activity uses an RF power detector (e.g., such as the LT5538 from Linear Technology) to measure the variation in time of RF power arriving at an antenna. This time series is then compared against the known time signatures of a set of RC radio protocols. If a set of periodic energy pulses is observed by the RF detector that matches that expected from a known RC protocol, it can be inferred that this RC protocol is being used within the area of coverage of the antenna. Comparison of measured RF energy against known RF signatures can be performed using techniques such as convolution, matched filtering, or other methods.

The method then moves to step 720 where the frequencies being used by the RC device are determined. The method then moves to step 725 where a frequency hopping scheme of the RC device is determined.

As an example, some implementations of step 720 to determine the frequencies and frequency hopping scheme used by the detected RC device can include RC radio link characterization using an array of transceivers, e.g., operating at particular frequencies in one or more frequency bands (e.g., 2.4 GHz transceivers in the 2.4 GHz frequency band). By way of example, the 2.4 GHz frequency band is discussed, but other RC frequency band such as 6.2 GHz, 5.8 GHz, 1.3 GHz, 900 MHz and/or 433 MHz can similarly be used in implementations in accordance with the disclosed embodiments of the present technology. In various implementations, for example, a system implementing method 700 may include 2.4 GHz transceiver Integrated Circuits (ICs). Some examples of the 2.4 GHz transceiver ICs can include low-cost and readily available transceiver ICs, such as those used to enable local wireless solutions in wireless computer peripherals. These ICs typically provide a number of functions besides transmission and reception of radio packets.

For example, 2.4 GHz transceiver ICs can be used to measure the Received Signal Strength Indicator (RSSI) on any given channel in the 2.4 GHz band. By measuring RSSI on each channel, for example, a device or system employing such transceiver ICs can effectively characterize the power spectrum in the 2.4 GHz band. Additionally, by measuring RSSI in a single channel for several seconds, the device or system may be able to characterize temporal variation in RF energy and perhaps identify the periods of time during which that channel is used by an RC protocol. It is noted that, for example, there are large numbers of channels within the 2.4 GHz band, e.g., each of which may need to be characterized in this manner. For example, if the ISM band is divided into 100 channels each with 1 MHz bandwidth, each channel would need to be monitored for several seconds, resulting in an initial scan time of several minutes, a detection time that would not suffice timely detection of RC vehicles.

To improve performance, a system implementing method 700 may include an array or other organization of a plurality of radios ICs (e.g., 2.4 GHz transceiver ICs) utilized in parallel. The system implementing method 700 may then employ the radio ICs in various arrangements in a number of modules, e.g., referred to as a transceiver module. For example, the transceiver module is equipped with a microprocessor interfacing with the array or other arrangement of the several transceivers. A complete system may use one or several such transceiver modules. A central data processing system or controller, e.g., which may also be referred to as a controller module, synchronizes the measurements generated by the transceivers and accumulates all data for processing. This data is used to generate a time series of power in each band within the 2.4 GHz band.

Provided with this data, the central controller is able to determine the frequency hopping schemes utilized by detected RC protocols. The timing and order of this frequency hopping can be precisely inferred, yielding valuable information that can be leveraged for subsequent interference efforts.

The method then moves to step 730 where the timing and order of this frequency hopping is precisely determined. In some implementations in which the RC device employs DSSS, the method 700 may include an optional step 735, where the chipping code being used by the RC device is determined.

The method then moves to step 740 where the determined communication protocol of the RC device is interfered with, e.g., by transmitting signals at the precise frequency and timing as the frequency hopping scheme of the RC device. For example, in some implementations, step 740 includes transmitting specific control and/or control support signals to assert control over the RC device, e.g., which can be used to controllably direct the travel and/or land or stop the RC device.

Example RC Vehicle Detection, Characterization, and Engagement System

Figure 8:
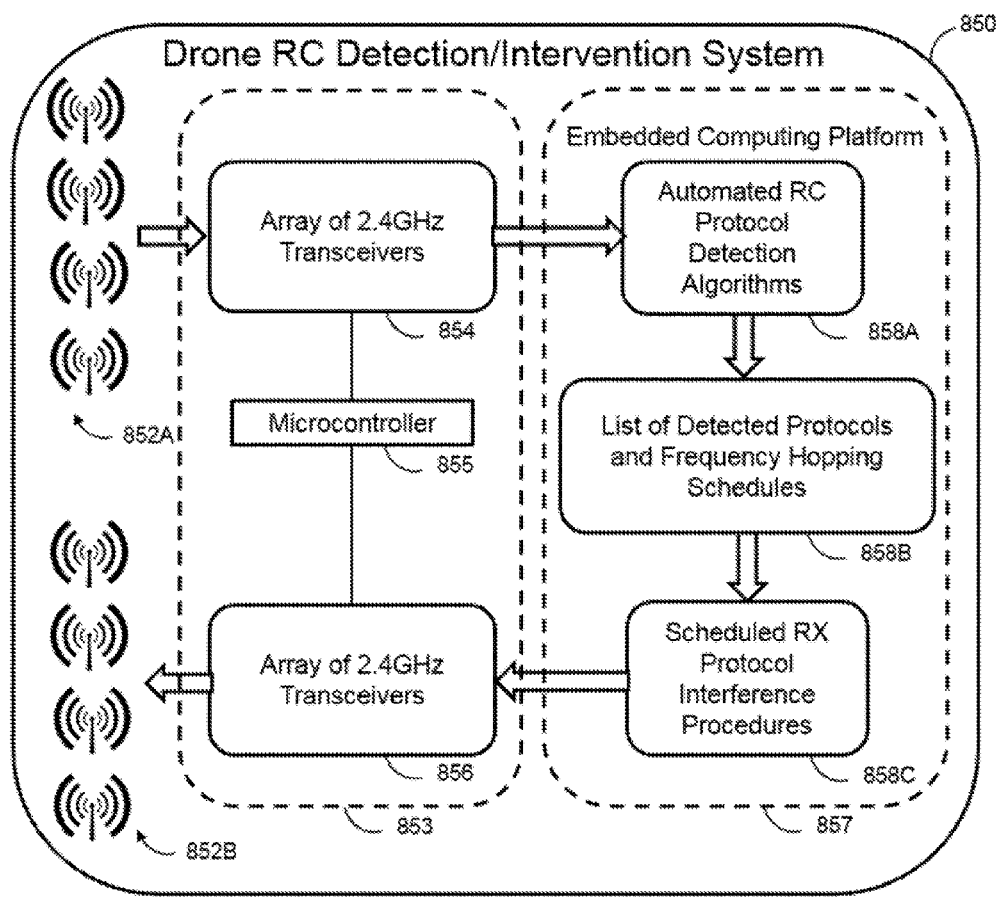
FIG. 8 depicts a diagram of an example system configured to detect, characterize, and engage RC vehicles using radio control communication signals.

FIG. 8 depicts a diagram of an example system 850 configured to detect, characterize, and engage RC vehicles using radio control communication signals, e.g., in accordance with the method 700 described with reference to FIG. 7.

System 850 includes a transceiver unit 853 in communication with one or more arrays of antennas 852 (e.g., directional and/or omnidirectional) to monitor and generate communication signals between the system 850 and RC vehicles in communicative range. In the example shown in FIG. 8, an array of antennas 852A includes one or more antennas configured to receive communication signals on a plurality of frequencies (e.g., scan frequencies in the one or more frequency bands, such as the 2.4 GHz band). The array of antennas 852B includes one or more antennas configured to transmit communication signals on a plurality of frequencies (e.g., transmit signals on frequencies in the one or more frequency bands, such as the 2.4 GHz band). Further, in the example shown in FIG. 8, the transceiver unit 853 includes a first transceiver group 854 including an arrangement of radio transceiver ICs (e.g., 2.4 GHz transceiver ICs) in communication with the array of antennas 852A, and a second transceiver group 856 including an arrangement of radio transceiver ICs (e.g., 2.4 GHz transceiver ICs) in communication with the array of antennas 852B. The transceiver unit 853 includes one or more data processing units 855 in communication with the first and second transceiver groups 854 and 856, respectively. In the example shown in FIG. 8, the data processing unit 855 includes a microcontroller. Other examples of the data processing unit 855 are described with respect to FIG. 3.

In some implementations, for example, transceiver unit 854 can include low-noise amplifier(s) (LNA), band-pass filters(s) (BPA) and/or other signal processing circuitry to condition the signals.

System 850 includes a controller unit 857 in communication with the transceiver unit 853. In some implementations, for example, the controller unit 857 can include a computer platform configured to execute software modules to implement the method 700. In the example shown in FIG. 8, the computer platform 857 includes a software module 858A including automated RC protocol detection algorithms in accordance with the method 700, a software module 858B including one or more lists of detected protocols and frequency hopping schedules, and a software module 858C including one or more scheduled RX protocol interference procedures. While only one transceiver unit 853 and one controller unit 857 are shown in the example of FIG. 8, the system 850 can include a plurality of transceiver units 853 and controller units 857. Also, for example, while not shown in FIG. 8, the system 850 can include a display unit to interface with a user, e.g., including various data display devices (e.g., monitors, speakers, etc.) and data entry devices (e.g., keyboard, mouse, voice recognition devices, etc.).

Like system 100, system 850 includes a modularized architecture to scale to a variety of installations for various types of applications. In some embodiments of the system 850, for example, the units of the system 850 can be contained and/or coupled to a single housing or containment structure, e.g., depending on the types and quantity of antennas selected for the array of antennas 852, and in turn the amount of transceiver units 853 to correspond to the antennas. In some embodiments of the system 850, for example, the units of the system 850 can be configured in separated structures that are in communications with one another. For example, the array of antennas 852 and the transceiver unit 853 can be configured in separate units from the controller unit 857, e.g., analogous to the signal detection units 110 and the data processing system 120, respectively.

In some embodiments of the system 850, the system 850 can include standard RF measurement technology for RC radio link characterization, which may impose an increased material cost but improve higher processing speeds. In one example, the system may include a mixer to mix the signal received by the antenna from 433 MHz, 900 MHz, 1.3 GHz, 2.4 GHz, 4 GHz, 6.2 GHz, and 5.8 GHz to a lower carrier frequency, e.g., which may be as low as a few hundred MHz. This signal can then be sampled at a sufficient rate as determined by the Nyquist sampling criterion. Time and frequency domain analysis can be performed on the resulting data to generate an accurate schedule of frequency hopping. Further, this analysis provides the benefit of enabling discovery of chipping codes in systems using DSSS or similar systems, e.g., as in the optional process 735 described with reference to FIG. 7. Implementation of the process 735, for example, can effectively eliminate the coding gain provided by DSSS, assisting in subsequent interference efforts.

Figure 9:
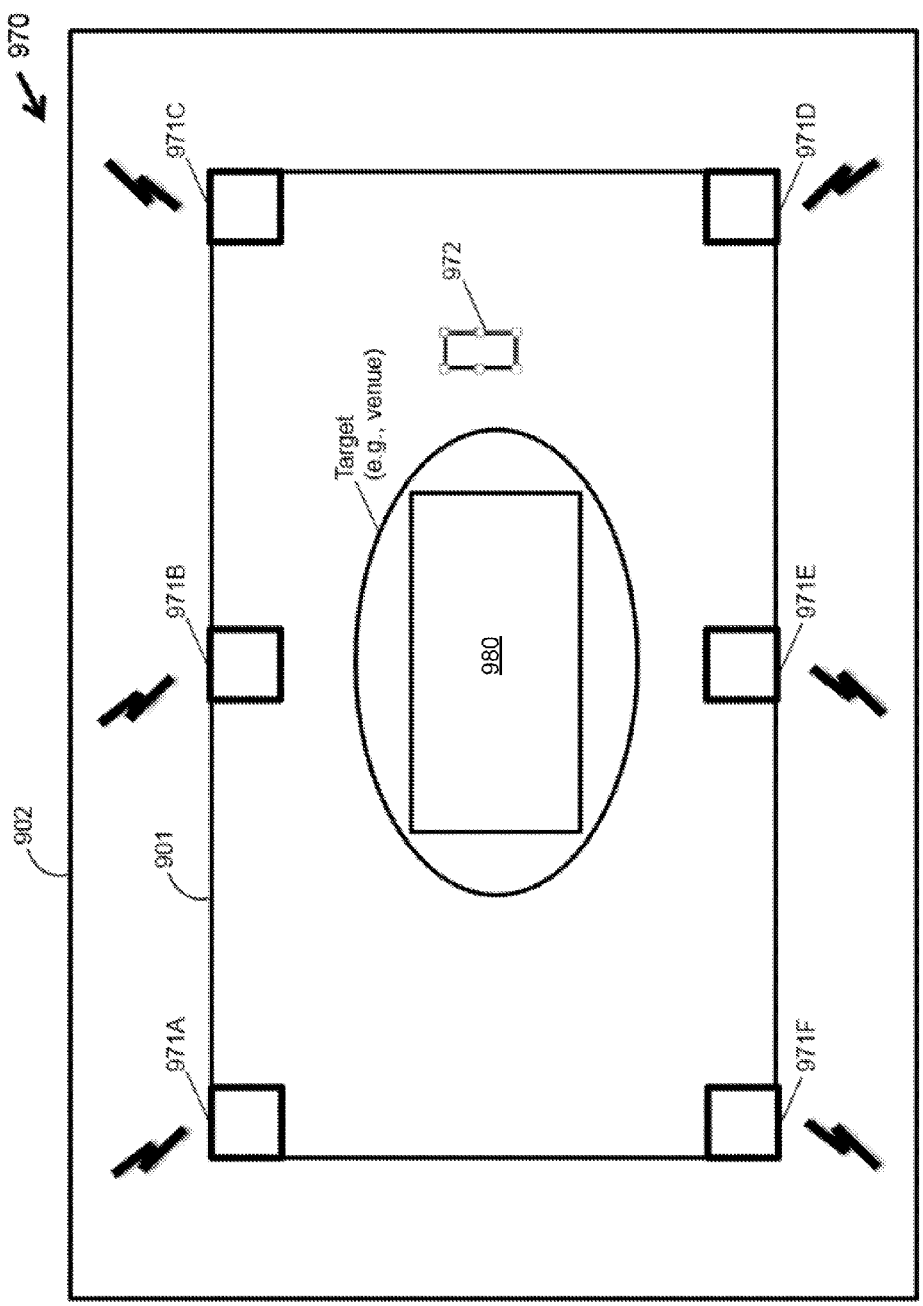
FIG. 9 depicts an example implementation of a system for providing a protective boundary to drones around a designated area encompassing a target.

FIG. 9 depicts an example implementation of a system 970 (such as system 850 described with respect to FIG. 8) for providing a protective boundary to drones around a designated area encompassing a target 980. In this example, the system 970 includes a plurality of signal detection units 971A-971F and a data processing system 972. Signal detection units 971A-471F are positioned around a designated area encompassing a target 980, e.g., such as a venue, like a stadium, building, park, open air theatre, established or make-shift gathering area, etc., to create the first boundary zone 901. For example, each of the signal detection units 971 can include one or more transceiver units in communication with antennas, as described with respect to FIG. 8. For example, the antennas can include omnidirectional or directional antennas. A data processing system 972 is in communication with each of the detection units 971A-971F to provide and to receive data for operation of the system 970. The data processing system 972 includes a controller unit to process the data pertaining to a detected RC drone. The data processing system 972 can be implemented on a user device, e.g., including but not limited to, at least one of a laptop or desktop computer, smartphone, tablet, or wearable device by a graphical user interface of an application that interacts with or operates the device.

In an example operation of the system 970, the system 970 detects the presence of one or several RC devices by scanning the frequencies (e.g., frequencies of the 2.4 GHz frequency band) using antennas, such as antennas 852A described with respect to FIG. 8. The detected communication signals may be received by a transceiver unit 853 via an array of transceivers 854, as described with respect to FIG. 8. The system 970 processes the received communication signals as data by the controller unit 957, as described with respect to FIG. 8. For example, the controller unit 857 described with respect to FIG. 8 may implement software modules, such as 858A and 858B described with respect to FIG. 8 to determine frequencies being used by the detected RC device and determine its frequency hopping scheme. The system 970 is able to precisely determine the timing and order of this frequency hopping based on the data processing of the controller unit 857 described with respect to FIG. 8.

In some operations, the system 970 transmits signals at the precise frequency and timing as the frequency hopping scheme of the RC device to interfere with the determined communication protocol of the RC device, e.g., causing the RC device to land or divert it from its path of travel (and outside the protected zone).

Figure 10:
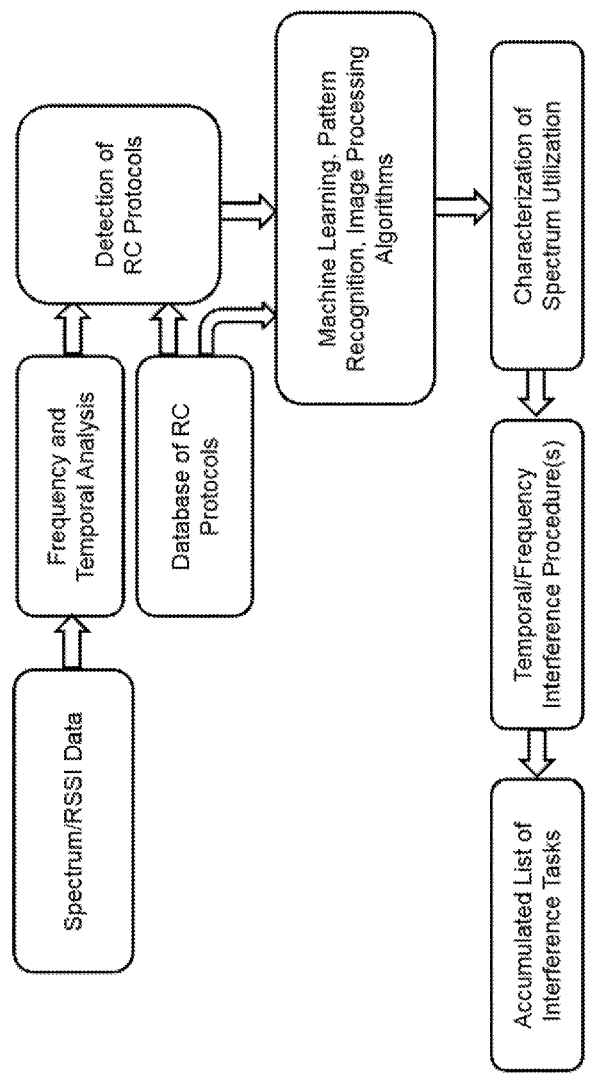
FIG. 10 depicts a diagram of an example data flow for processing the detected communication signals.

FIG. 10 depicts a diagram of an example data flow for processing the detected communication signals, e.g., by the controller unit 857 of the system 850 described with respect to FIG. 8. The example data processing flow illustrates various implementations of aspects of the method 700 described with respect to FIG. 7, e.g., for detection, characterization and intervention with RC drones. As shown in the diagram of FIG. 10, a controller unit can receive data, e.g., spectrum and/or RSSI data, for processing. The controller unit analyzes the data to determine time and frequency properties of the detected communication signals. The analyzed data is processed to compare the determined time and frequency properties of the detected communication signals to known RC protocols to determine the RC protocol of the detected RC drone. In some implementations, the controller unit can implement machine learning, pattern recognition, and image processing algorithms. For example, the controller unit can carry out image processing approaches to compute/identify interference tasks. For example, spectrum utilization can be considered a two-dimensional variable, where RSSI is a function of both time and frequency. In this manner, the spectrum can be represented as a two-dimensional image, making image processing techniques particularly useful for detection of patterns or other artifacts of RC activity.

Still with reference to FIG. 10, the controller unit can characterize the activity of the RC drone using spectrum utilization, which can identify the RC drone. For example, the RC drone can be identified according to a manufacturer model and/or by its characteristics. Identification of the RC drone can include determining if the RC drone is authorized to travel in the protected zone. The controller unit can generate instructions for temporal and/or frequency based interference procedures that the system can implement to engage the drone and intervene in its travel. In some implementations, the generation of the instructions can include accumulating a list of interference tasks, which is characterized by a frequency or set of frequencies and a time or set of times during which those frequencies are to be transmitted/interfered/utilized by the system. In some implementations, for example, RC detection and characterization algorithms can be used by the controller unit to generate lists of such tasks, e.g., generate a set of times and frequencies to transmit.

Actuated Directional Antennas, Antenna Arrays, or Electronic Beam-Steering to Optimize Detection and Characterization and to Enable Operator Localization There exist a number of well-known methods to direct transmitted RF power in desired directions and to simultaneously increase the sensitivity of receiver equipment to power arriving from that direction. The most familiar example of such a system is an antenna, e.g., of which there are two primary types, namely omnidirectional or directional. An omnidirectional antenna is typically mounted in a vertical configuration and directs RF power equally in all directions along its azimuthal angle. Transmitted RF power varies with the elevation angle (e.g., typically with small amounts of power emanating from the top and bottom of the antenna), but there is little or no variation in the power as a function of azimuth angle. A directional antenna is designed in such a way as to focus transmitted RF power in a particular direction, meaning that the transmitter RF power follows a function that is non-constant as a function of the azimuth angle. This function is known as a gain pattern and is typically characterized by a main lobe with maximal gain, side lobes with reduced gain, and a null region behind the antenna with very low gain. Antenna gain patterns, whether omni or directional, are identical for transmission and reception; an antenna with a large transmission gain at a particular angle will have the same large reception gain at that angle. Moreover, for example, directional antennas can be mechanically actuated to enable scanning. Alternatively, for example, a number of static directional antennas can be installed in such a way that scanning can be performed by switching between the antennas in the array. For example, by cycling through four antennas each of which has a 90-degree beam width, a 360-degree scan of the azimuth angle can be achieved.

Another method to achieve directional gain in RF transmission is to leverage phased arrays of omnidirectional antennas, which can be employed by the disclosed systems. In such a system, a number of omnidirectional antennas are arranged in a particular spatial distribution, and their input and received signals are delayed by an appropriate phase in such a way that their combined radiation pattern can be controlled. This is known as beam steering, and the associated gain pattern can be manipulated by adjusting phase delays, thereby allowing such a network of antennas to scan. Phased antenna arrays are characterized by the same transmission/reception symmetry as directional antennas.

In some implementations, the disclosed systems can leverage actuated directional antennas, phased antenna arrays, and/or a network of switched antennas to perform scanning and maximize the likelihood of detection of an RC radio link and increase SNR in order to more accurately characterize its frequency hopping pattern. It is noted that the term "actuated antenna" or simply "antenna" may be used for brevity to represent any such system. Here, the system can be used to presume that an operator, and thereby the RC transmitter, is confined to the ground, even if the receiver is on an aerial vehicle. In such implementations, for example, the directional antenna used to detect the RC transmitter need only scan about the azimuth angle, a one-dimensional scan that occurs much faster than the multidimensional scan that might otherwise be required.

For example, a scan of the azimuth angle may be performed as follows. (1) Gather RF power data for a short period of time (0.25 seconds). (2) Use matched filtering to quantify the power of an RC signal in the RF power data. (3) Advance the scan by some fraction of the main beam width and repeat until the entire angular range has been characterized. (4) If the maximum detected RC signal metric exceeds a threshold, return the antenna to the corresponding angle.

Also, for example, a number of other scan methods may be used, such as gradient ascent or other well-known optimization techniques.

With the antenna optimally oriented at the operator, SNR may be dramatically improved, enabling highly robust detection and characterization.

Selective Interference Targeting RC Radio Protocols

Upon successful detection of an RC radio link, the disclosed systems can intervene to establish a no-fly zone. In some implementations, the method 700 described with reference to FIG. 7, e.g., at the process 740, uses RF interference to degrade the quality of the radio link sufficiently for the operator to lose control of the vehicle.

This interference can take several forms. In one example, the system can use high power, broadband transmission to interfere across the entire 2.4 GHz band. While this will be effective, it requires high transmit power and might also affect performance of other systems using the 2.4 GHz band nearby, such as Wi-Fi and Bluetooth.

In another example, the system leverages the precisely determined frequency-hopping schedule to enable selective interference. By knowing the timing and frequency of each transmission, the system is able to precisely match its interference transmissions to the same times and channels. For example, the overall power required for this "selective interference" system to disable an RC radio link decreases significantly, and the negative impact on other devices using the 2.4 GHz band is minimized or potentially negligible.

For example, for RC transmitters with transmit power greater than 4 dBm, the pertinent FCC regulation (e.g., FCC 15.247) and corresponding international regulations requires that at least 15 frequencies within the 2.4 GHz band must be used and that transmit power not exceed 20 dBm. Currently, all commercially available RC transmitters meet these requirements. The disclosed systems can be configured to hop on the same channels and at the same times, and may optionally be limited to the same overall power limit, thereby making it compatible with FCC 15.247 and corresponding international regulations.

For example, interference transmissions may be transmitted using an omnidirectional antenna, or, given knowledge of the vehicle location, may be directed at the vehicle using a directional antenna.

RC Radio Link Detection Using Phase Locked Loop Techniques

In some embodiments, the system 850 as described with respect to FIG. 8 may include RF measurement hardware that is designed specifically for quickly and efficiently measuring the band of interest. In one such example, the received RF signal may be filtered and amplified using RF hardware having a phase locked loop system, e.g., in accordance with various embodiments of the process 710 described with reference to FIG. 7. In some embodiments, the phase locked loop system is employed in the transceiver module 853 of the system 850 described with reference to FIG. 8. In such embodiments, the resulting RF signal may be mixed with a Local Oscillator (LO) signal provided by the Phase Locked Loop (PLL). The PLL can be implemented from discrete parts on a printed circuit board (PCB) of the hardware in the transceiver module 853 (described with reference to FIG. 8) or may be provided by a complete PLL integrate circuit. The PLL can accurately produce a set of frequencies that can be selected using a digital communication protocol such as SPI or I2C, or it may be selected using an analog voltage.

Mixing the received RF signal with the output of the PLL results in a version of the received signal that is shifted in the frequency domain to an intermediate frequency (IF). The IF signal is typically at a lower frequency, making it easier to manipulate and measure. In a standard spectrum analyzer, this signal might be sampled by a high-rate analog to digital converter (ADC), and the resulting digitized data may be analyzed using FFT approaches to generate a measurement of the spectrum. However, the Nyquist sampling criteria requires that the IF signal be sampled at a sample rate of at least twice the bandwidth of the signal. For proper signal reconstruction, a multiplier of 2.5 may be considered. In typical 2.4 GHz systems, the IF signal may have a bandwidth of 50-100 MHz, thus necessitating ADC sample rates of 125-250 MS/sec. ADCs capable of such high rates are typically expensive, and extracting frequency content from the signal the resulting digitized data using FFT is tremendously computationally burdensome. A specialized FPGA device or other high-power computing system may be required, further driving cost.

Therefore, in these example embodiments of the system 450 using PLL, rather than using an ADC to measure the IF signal, the IF signal is instead band-pass-filtered with a narrow-band filter, and the resulting signal is amplified using an OPAMP or another amplifier. Thereafter, the power of the resulting signal is measured using an RF power detector, which produces an analog output whose amplitude is related to the power of the RF signal. This analog signal has a much lower bandwidth than the IF signal, significantly decreasing the performance requirements of ADC systems. It should be noted that the process of mixing, band-pass-filtering, amplification, and power measurement described here is performed in duplicate on two LO signals which are 90 degrees. This is required to ensure successful measurement of the RF input power.

The analog signal outputted by the RF power detector may be filtered, amplified, or otherwise conditioned using an analog network, and is thereafter sampled by an ADC.

In order to generate spectral measurements, the example PLL-based technique used in the process 710 described with reference to FIG. 7 may use a microcontroller to command the PLL system to sweep the LO through a desired set of frequencies. This causes the I and Q signals to sweep through a set of frequencies, and the subsequent narrow-band BPF serves to selectively pass a sweep through the IF's spectrum. Thus, at each step through the LO sweep, the BPF allows through a particular part of the IF spectrum, and the ADC measurement at that time corresponds to the power present in the RF signal at the corresponding frequency.

RC radio signals are typically characterized by short radio transmissions typically less than a few milliseconds in length. In some implementations, for example, to capture these signals with a reasonable level of resolution, the example system can be operated to sweep through the 2.4 ISM band at least 2,500 times per second and with frequency resolution of 1 MHz or finer. In examples where the ISM band is 100 MHz in width, this resolution would require a sweep of the PLL through 100 LO frequencies, resulting in 250,000 frequencies per second. Further, for example, the ADC is required to sample both the I and Q signals at each LO frequency, resulting in a sample rate of 500 KHz. This example sample rate is nearly three orders of magnitude lower than the sample rate required by typical spectrum analyzer systems to capture IF signals resulting from mixing the 2.4 GHz band.

Interference/Intervention of Video Transmissions

In some instances of RC vehicle operation, the vehicle is equipped with a video camera, in which the data from the RC vehicle is transmitted back to the operator and displayed on a screen. The operator may rely on the video on this screen for navigation and orientation purposes, in particular if the RC vehicle is not within sight due to obstructions or distance.

The disclosed systems can be equipped with directional antennas for frequencies commonly used for video transmission. For example, these frequencies can include but are not limited to bands near 433 MHz, 900 MHz, 1.3 GHz, 2.4 GHz, 4 GHz, 6.2 GHz, and 5.8 GHz. Transmissions in these channels may occur via analog or digital radio protocols. The disclosed systems can include a number of antennas tuned to these frequencies to detect video transmission links via RF power detection in accordance with the disclosed methods described herein, such as those for detection of 2.4 GHz RC radio protocols.

With the direction from the system to the operator having been discovered using the methods described above, directional antennas for these typical video transmission frequencies can also be directed toward the user, and disruptive RF transmissions can be directed at the user. For example, such intervention may occur in bursts, as a warning to the operator, or steadily, in order to disable their use of the vehicle.

Mobile Configurations

Figure 11:
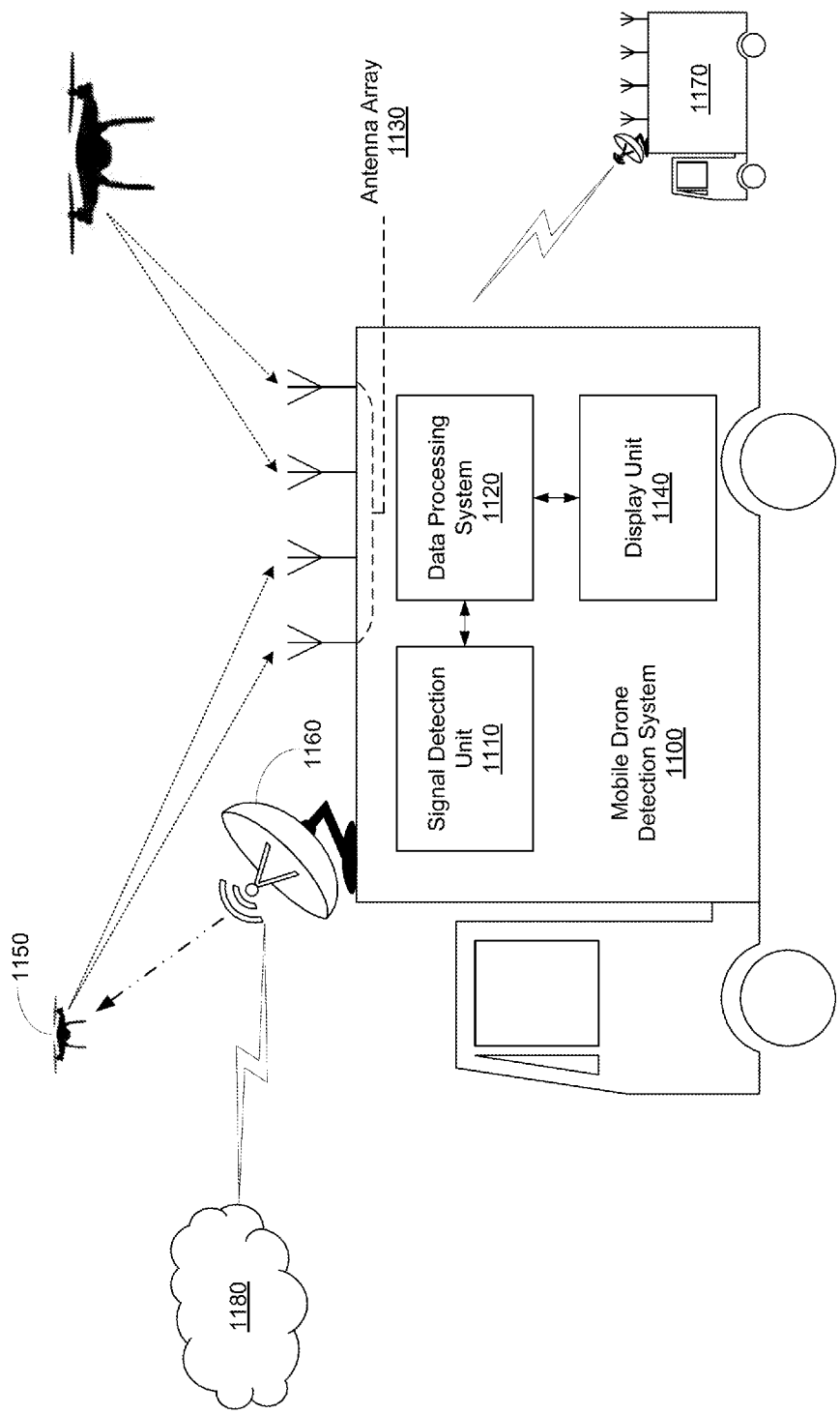
FIG. 11 depicts an example embodiment for a mobile drone detection system.

FIG. 11 depicts an example embodiment for a mobile drone detection system 1100. Drone detection, characterization, and intervention systems such as 100 (described with reference to FIGS. 1) and 850 (described with reference to FIG. 8) can be configured in a modularized architecture that allows the system to be mounted onboard a vehicle for real-time, mobile drone detection, characterization and intervention. In this example, system 1100 includes a signal detection unit 1110 comprising the array of antennas 1130 and associated transceiver units (not shown); and a data processing system 1120 comprising, which may include the controller unit 857 described with reference to FIG. 8. The system 1100 is operable to implement the method 700 described with reference to FIG. 7 in order to detect, characterize and/or engage drones in a protected zone monitored by the mobile drone detection system 1100.

For example, in operation, a drone traveling in a monitored zone by the system 1100, such as drone 1150, can be detected by the signal detection unit 110 via scanning frequencies for RC link activity by the antenna array 1130. The data associated with the detected communication signals, which may be pre-processed by the signal detection unit 1110, may be provided to the data processing unit 1120 to characterize the entity affiliated with the detected communication signals. The data processing unit 1120 can engage the drone, e.g., generating commands to the one or more active transmitters 1160 through the corresponding transceiver unit of the detection unit 1110. In some embodiments, for example, the system 1100 can include a display unit 1140 for an operator of the vehicle to see the processed data displayed, and/or input commands for control of the data processing system 120. In the example embodiment of FIG. 11, the signal detection unit 1110 can include individual antennas coupled to the corresponding transceiver groups and a centralized data processing unit of the transceiver module disposed in a location of the vehicle.

In some embodiments, a single mobile drone detection system 1100 can be mounted on a single vehicle and communicate with another or other, independent mobile drone detection system(s), such as system 1170, to form a dynamic drone detection system. For example, the individual mobile drone detection systems 1100 and 1170 can share information with one another for increased accuracy and situational awareness, as well as improved system redundancy. Whereas, in some embodiments, the signal detection unit 1110 of the mobile drone detection system 1100 can be mounted on multiple individual vehicles, where the captured RC communication signals are processed as data and transmitted to a single centralized processing center at a remote location, e.g., such as a cloud processing network 1180. Similarly, for example, the captured RC communication signals are processed as data and transmitted across a network of the vehicles mounting the full or partial systems 1100 to reach a localized data processing system 1120 on one of the (or multiple select) vehicles, e.g., within a communication range of the transmitters on the respective vehicles. In some implementations, the signal detection units 1110 of the single or multi-vehicle mobile detection systems 1100 can be configured to constantly send data to a centralized processing node 1180 (e.g., servers), from which the systems may also receive operating instructions.

In some implementations of the mobile drone detection system 1100, a plurality of antennas of the signal detection unit 1110 can be installed on the vehicle in a variety of arrays to create overlapping detection and neutralization fields. The size of the coverage zone can be modified on the fly to cover tens of feet to thousands of feet, e.g., such as engagement ranges of 100 feet, 600 feet or 1200 feet, or the like. Such modifications can be made via an operator using the display device 1140. For example, the mobile drone detection system 1100 can be operated from the interior of the vehicle or from a central location. In some implementations, for example, the mobile drone detection system 1100 can operate automatically without a human operator. For example, in implementations of the multi-vehicle mobile drone detection system, when vehicles move in a convoy formation, the vehicle-mounted antennas can interact to create larger protection zones and also share and process data in the field that will help the system learn in real-time in field deployments. The modular units of the systems 1100 and 1170 can be installed on a variety of sized vehicles, including air, sea or ground military vehicles such as jeeps, Humvees, tanks, boats, helicopters, etc. and/or commercial vehicles such as cars, trucks, motorcycles, etc. Similarly, the module units of the systems 1100 and 1170 can be removed from a vehicle and placed someplace else, e.g., to provide a forward operating base or on a rooftop. The modular units can be housed in durable and mountable/detachable housing units that withstand extreme weather conditions, and can run on standard power specifications, e.g., 110 V. The modular units can automatically detect, track and engage unmanned systems operating in the air, on the water, and on the ground, e.g., such as ground drones, to create zones of protection.

Example Implementations

Example implementations of systems and methods in accordance with the present technology can include the following features and operations to detect, characterize and/or engage one or more drones in and around a protected area. The examples below can be implemented in various combinations.

In some implementations, a system in accordance with the present technology can detect RC radio signals via RF power measurements. The example system can include and use one or more directional antennas, LNA, band-pass filtering and/or other radio techniques to detect RC radio signals with improved SNR and performance. The system can exploit temporal patterns in common RC protocols, e.g., referred to as signatures, and search RF power data measurements for evidence of such signatures using matched filtering, convolution, or other analogous methods.

In some implementations, a system in accordance with the present technology can include RF measurement hardware that is designed specifically for quickly and efficiently measuring the band of interest by filtering and amplifying the received RF signal using a PLL system. By mixing the received RF signal with a LO signal provided by the PLL system of the detection unit, the system can accurately and inexpensively (e.g., with reduced power, size and cost to the transceiver modules) analyze and package the detected communication signals scanned by the antenna units to provide to the data processing system for their characterization to identify time and/or frequency features of such signals associated with the detected drone.

In some implementations, a system in accordance with the present technology can characterize RC radio links in time and frequency domains, e.g., including but not limited to, determination of frequency hopping scheme, determination of DSSS chipping codes, and/or determination of timing of RF pulses.

For example, in some implementations, the system can use a signal mixer, high speed data acquisition unit and dedicated computing hardware, e.g., such as CPUs, FPGAs, or digital signal processing equipment to precisely characterize RC radio links.

For example, in some implementations, the system can use one or more low-cost 2.4 GHz transceivers to characterize RC radio links in time and frequency domains.

For example, in some implementations, the system can use actuated directional antennas, arrays of multiple directional antennas, and/or phased antenna arrays to locate an operator of an RC vehicle.

For example, in some implementations, the system can transmit signals to cause selective interference of RC radio protocols, in which the precise knowledge of transmission timing and frequency hopping is exploited to enable the system to transmit interfering RF energy at the same time and on the same frequencies, e.g., thereby reducing the power required to interfere and minimizing the impact on other devices operating on the 2.4 GHz band.

For example, in some implementations, the system can use RF power detection hardware and/or radio transceivers, which may be combined with antennas, to detect radio links providing video data from an RC vehicle to an operator or other agent.

For example, in some implementations, the system can use directional antennas to transmit interfering signals in the direction of the operator of an RC vehicle to disable reception of video and other data.

EXAMPLES

The following examples are illustrative of some embodiments in accordance with the present technology. Other example embodiments in accordance with the present technology may be presented prior to the following listed examples, or after the following listed examples.

Example 1 includes a method for monitoring and protecting a designated area includes: detecting an object traveling to a zone including scanning one or more frequencies of one or more radio frequency (RF) signals; analyzing at least one of time and frequency information of the one or more RF signals to characterize the detected object; and engaging the detected object as an authorized or unauthorized object in the zone.

Example 2, includes the method of Example 1, wherein the zone is monitored by one or more wireless signal detection units comprising one or more antennas in communication with one or more transceivers, and wherein the detecting includes capturing wireless communication signals emanated by the object.

Example 3 includes the method of Examples 1 or 2, wherein the object communicates using a radio control (RC) communications protocol.

Example 4 includes the method of any of Example 1 to 3, wherein the scanned one or more frequencies include frequencies associated with one or more of 2.4 GHz, 6.2 GHz, 5.8 GHz, 1.3 GHz, 900 MHz, or 433 MHz radio control bands.

Example 5 includes the method of Example 3, wherein the detecting includes measuring RF power in one or more frequency bands of interest, generating a time RF signature based at least in part on the measured RF power, and comparing the generated time RF signature to one or more known RC protocols.

Example 6 includes the method of Example 5, wherein measuring the RF power is performed using a phase locked loop technique including mixing the one or more RF signals with a local oscillator signal provided by a phase locked loop unit to shift a frequency of the one or more RF signals to an intermediate frequency producing an IF signal, filtering the IF signal with a narrow-band filter, and amplifying the filtered IF signal, wherein the power of the amplified IF signal measured using an RF power detector produces an analog output whose amplitude is related to the power of the one or more RF signals.

Example 7 includes the method of Example 3, wherein the analyzing includes determining one or more frequencies used by the object, and determining a frequency hopping scheme of the RC communications protocol used by the object.

Example 8 includes the method of Example 7, wherein a characterization of the detected object includes determining a timing and an order of the frequency hopping scheme to produce an RC signature of the object.

Example 9 includes the method of Example 8, comprising comparing the RC signature of the object to one or more known RC protocols to determine the RC communications protocol of the detected object to produce the characterization.

Example 10 includes the method of Example 7, wherein the engaging includes transmitting an interference signal in synchrony with the RC communication protocol of the object.

Example 11 includes the method of Example 10, wherein transmitting the interference signal includes transmitting signals at a precise frequency and timing as the frequency hopping scheme exhibited by the object.

Example 12 includes the method of any of Examples 1 to 11, comprising seizing control of the detected object by injecting one or more data packets to control the object's travel.

Example 13 includes the method of any of Examples 1 to 12, comprising transmitting one or more disruptive signals to intercept communications of the detected object.

Example 14 includes the method of any of Examples 1 to 13, comprising analyzing direct sequence spread spectrum (DSSS) information to discover a chipping code used by the object.

Example 15 includes the method of any of Examples 1 to 14, wherein the object comprises an unmanned aerial vehicle (UAV), an unmanned terrestrial vehicle (UTV), or an unmanned marine vehicle (UMV).

Example 16 includes the method of any of Examples 1 to 15, wherein the zone surrounds a designated space or location.

Example 17 includes the method of Example 16, wherein the designated space or location includes at least one of a stadium, a school, a governmental facility, a monument, a commercial building, a factory, a power facility or power distribution line, a fuel processing facility or fuel distribution line, a transportation center including an airport, train station, ship port, or bus station, a residence, a shopping center, and a national border.

Example includes a system for protecting a territory from unauthorized drones, the system comprising: one or more wireless signal detection units positioned around a designated area and operable to detect signal transmissions from a drone flying in a detection region included inside and/or outside the designated area, the one or more wireless signal detection units being configured to determine authorization of the drone in the designated area zone, wherein each of the one or more wireless signal detection units includes one or more antennas, a transceiver unit, and a data processing unit; and a data processing system in communication with the data processing unit of each of the one or more wireless signal detection units, the data processing system being configured to process data from the one or more antennas of the one or more wireless signal detection units to determine if a detected drone is authorized to fly in at least the designated area and to process the data to provide the respective data processing units of the one or more wireless signal detection units with information including instructions to engage the drone.

Example 19 includes the system of Example 18, wherein each transceiver unit includes one or more radio transceiver integrated circuits (TICs) to manage signal transmissions and receptions with the one or more antennas, respectively, between the system and the drone in communicative range.

Example 20 includes the system of Example 18 or 19, wherein each transceiver unit includes a plurality of radio transceivers operable in parallel to characterize temporal use of one or more frequency bands.

Example 21 includes the system of any of Examples 18 to 20, wherein each transceiver unit includes a phase locked loop system and a radio frequency (RF) power detector to measure RF power associated with one or more RF signals scanned by the one or more antennas, the phase locked loop system being configured to mix the one or more scanned RF signals with a local oscillator signal to shift a frequency of the one or more scanned RF signals to an intermediate frequency (IF) producing an IF signal, to filter the IF signal with a narrow-band filter, and to amplify the filtered IF signal, and wherein the RF power detector is configured to measure the power of the amplified IF signal measured to produce an analog output whose amplitude is related to the power of the one or more scanned RF signals.

Example 22 includes the system of any of Examples 18 to 21, wherein the data processing system is configured to execute software modules including one or more of an automated RC protocol detection algorithm, a frequency hopping scheme detection algorithm, and a scheduled RC protocol interference algorithm.

Example 23 includes the system of any of Examples 18 to 22, comprising a display unit to interface with an operator of the system.

Example 24 includes the system of any of Examples 18 to 23, wherein the one or more antennas of the one or more wireless signal detection units include at least one of omnidirectional antennas and directional antennas.

Example 25 includes the system of any of Examples 18-24, wherein the drone communicates using a radio control (RC) communications protocol.

Example 26 includes the system of any of Examples 18-25, wherein the system is configured to implement the method of any of Examples 1-17.

Example 27 includes the system of any of Examples 18-26, wherein an array of wireless signal detection units and the data processing system is attached to a mobile vehicle.

Example 28 includes the system of Example 27, comprising a plurality of the systems operable on a plurality of mobile vehicles.

Example 29 includes the system of Example 28, wherein the plurality of systems operable on the plurality of mobile vehicles are in communication with a central processing center.

Example 30 includes the system of any of Examples 18-29, wherein an array of wireless signal detection units is attached to a mobile vehicle, and the data processing system is located in a fixed location in wireless communication with the array of wireless signal detection units.

Example 31 includes the system of any of Examples 18-30, wherein the drone comprises an unmanned aerial vehicle (UAV), an unmanned terrestrial vehicle (UTV), or an unmanned marine vehicle (UMV).

Example 32 includes the system of any of Examples 18-31, wherein the designated area surrounds or encompasses a designated space or location.

Example 33 includes the system of Example 32, wherein the designated space or location includes at least one of a stadium, a school, a governmental facility, a monument, a corporate building, a factory, a power facility or power distribution line, a fuel processing facility or fuel distribution line, a transportation center including an airport, train station, ship port, or bus station, a residence, a shopping center, and a national border.

Example includes a method for monitoring radio control (RC) vehicles in a designated area, comprising: detecting a RC vehicle traveling in a predefined zone that communicates using a RC communications protocol, the detecting including: scanning a plurality of frequencies of one or more radio frequency (RF) signals, measuring RF power in one or more frequency bands of the scanned plurality of frequencies, and generating a temporal RF signature based at least in part on the measured RF power; and analyzing at least one of time and frequency information of the one or more RF signals to characterize one or more features of the detected RC vehicle, the analyzing including: determining a frequency hopping scheme of the RC communications protocol used by the RC vehicle, and determining a timing and an order of the frequency hopping scheme to produce an RC signature of the RC vehicle.

Example 35 includes the method of Example 34, wherein the predefined zone is monitored by one or more wireless signal detection units comprising one or more antennas in communication with one or more transceivers, and wherein the detecting includes capturing one or more wireless communication signals emanated by the RC vehicle.

Example 36 includes the method of Example 34 or 35, wherein the one or more frequency bands include one or more of 2.4 GHz, 6.2 GHz, 5.8 GHz, 1.3 GHz, 900 MHz, or 433 MHz radio control bands.

Example 37 includes the method of any of Examples 34 to 36, comprising comparing the temporal RF signature to one or more known RC protocols.

Example 38 includes the method of any of Examples 34 to 37, comprising determining communication frequencies used by the RC vehicle.

Example 39 includes the method of any of Examples 34 to 28, comprising: comparing the RC signature of the RC vehicle to one or more known RC protocols to identify the RC communications protocol; and determining a characteristic of the RC vehicle including one or more of a make, model number, and a series number.

Example 40 includes the method of any of Examples 34 to 39, wherein measuring the RF power is performed using a phase locked loop technique including mixing the one or more scanned RF signals with a local oscillator signal provided by a phase locked loop unit to shift a frequency of the one or more scanned RF signals to an intermediate frequency (IF) producing an IF signal, filtering the IF signal with a narrow-band filter, amplifying the filtered IF signal, and measuring the power of the amplified IF signal using an RF power detector to produce an analog output whose amplitude is related to the power of the one or more scanned RF signals.

Example 41 includes the method of any of Examples 34 to 40, comprising identifying whether the RC vehicle is an authorized or an unauthorized object in the predefined zone; and in response to identifying that the RC vehicle is an unauthorized object, engaging the RC vehicle by transmitting an intervening signal in synchrony with the RC communication protocol of the RC vehicle.

Example 42 includes the method of Example 41, wherein transmitting the intervening signal includes transmitting RF signals at a precise frequency and timing as the frequency hopping scheme exhibited by the RC vehicle.

Example 43 includes the method of Example 41 or 42, wherein the engaging includes seizing control of the RC vehicle by injecting one or more data packets to control the object's travel, or disrupting normal communication of the RC vehicle to disable remote control between the RC vehicle and the RC vehicle's operator.

Example 44 includes the method of any of Examples 34 to 43, wherein the predefined zone includes a first zone and a second zone at least partially outside the first zone.

Example 45 includes the method of any of Examples 34 to 44, wherein the first zone includes a site or location including at least one of a stadium, a school, a governmental facility, a monument, a commercial building, a factory, a power facility or power distribution line, a fuel processing facility or fuel distribution line, a transportation center including an airport, train station, ship port, or bus station, a residence, a shopping center, and a national border.

Example 46 includes the method of any of Examples 34 to 45, wherein the RC vehicle comprises an unmanned aerial vehicle (UAV), an unmanned terrestrial vehicle (UTV), or an unmanned marine vehicle (UMV).

Example 47. A system to detect, characterize, and engage radio control (RC) vehicles using radio control communication signals, the system comprising: one or more receiving antennas configured to receive one or more radio frequency (RF) communication signals on a plurality of frequencies emanating from an RC vehicle in communicative range of the one or more receiving antennas; a transceiver unit in communication with the one or more antennas to preprocess the one or more received RF communication signals and to generate one or more RF output signals, the transceiver unit including one or more transceivers and a data processing unit; one or more transmit antennas configured to transmit the one or more RF output signals towards the RC vehicle; and a controller unit in communication with the transceiver unit to: analyze at least one of time and frequency information of the one or more RF communication signals to determine a frequency hopping scheme of a RC communications protocol used by the RC vehicle and determine a timing and an order of the frequency hopping scheme to produce an RC signature of the RC vehicle; and engage the RC vehicle by commanding the transceiver unit to produce the one or more RF output signals in synchrony with the RC signature of the RC vehicle.

Example 48 includes the system of Example 47, wherein the one or more receiving antennas include one or both of a directional antenna and an omnidirectional antenna.

Example 49 includes the system of Example 47 or 48, wherein the one or more transmit antennas include one or both of a directional antenna and an omnidirectional antenna.

Example 50 includes the system of any of Examples 47 to 49, wherein the one or more transmit antennas are configured to transmit the one or more RF output signals on a plurality of frequencies associated with one or more radio control frequency bands.

Example 51 includes the system of any of Examples 47 to 50, wherein the one or more receiving antennas are configured to scan frequencies associated with one or more radio control frequency bands.

Example 52 includes the system of Example 50 or 51, wherein the one or more radio control frequency bands are selected from a group consisting of 4 GHz, 6.2 GHz, 5.8 GHz, 1.3 GHz, 900 MHz, and 433 MHz bands.

Example 53 includes the system of any of Examples 47 to 52, wherein the one or more receiving antennas and/or one or more transmit antennas include a plurality of antennas arranged in one or more antenna arrays.

Example 54 includes the system of Example 53, wherein the transceiver unit includes a first transceiver group including an arrangement of radio transceiver integrated circuits (ICs) in communication with an array of receiving antennas, and a second transceiver group including an arrangement of radio transceiver ICs in communication with an array of transmit antennas.

Example 55 includes the system of any of Examples 47 to 54, wherein the transceiver unit is configured to pre-process the one or more received RF communication signals by commanding the one or more receiving antennas to scan a plurality of frequencies of RF signals, measuring the RF power in one or more frequency bands associated with the plurality of frequencies, and generating a temporal RF signature based at least in part on the measured RF power.

Example 56 includes the system of any of Examples 47 to 55, wherein the transceiver unit includes a phase locked loop unit configured to measure the RF power by mixing the one or more scanned RF signals with a local oscillator signal to shift a frequency of the one or more scanned RF signals to an intermediate frequency (IF) producing an IF signal, filtering the IF signal with a narrow-band filter, and amplifying the filtered IF signal; and an RF power detector configured to measure the power of the amplified IF signal to produce an analog output whose amplitude is related to the power of the one or more scanned RF signals.

Example 57 includes the system of any of Examples 47 to 56, wherein the controller unit is further configured to identify whether the RC vehicle as an authorized or an unauthorized object in the predefined zone, and in response to identifying that the RC vehicle is an unauthorized object, to engage the RC vehicle by transmitting an intervening signal in synchrony with the RC communication protocol of the RC vehicle.

Example 58 includes the system of any of Examples 47 to 57, wherein the controller unit includes a computer including a processor and memory storing executable software modules including one or more of an automated RC protocol detection algorithm, a frequency hopping scheme detection algorithm, and a scheduled RC protocol interference algorithm.

Example 59 includes the system of any of Examples 47 to 58, wherein the transceiver unit includes a low-noise amplifier and a band-pass filter.

Example 60 includes the system of any of Examples 47 to 59, wherein the one or more receiving antennas are arranged to form a predefined zone including a first zone and a second zone at least partially outside the first zone.

Example 61 includes the system of Example 60, wherein the first zone includes a site or location including at least one of a stadium, a school, a governmental facility, a monument, a commercial building, a factory, a power facility or power distribution line, a fuel processing facility or fuel distribution line, a transportation center including an airport, train station, ship port, or bus station, a residence, a shopping center, and a national border.

Example 62 includes the system of any of Examples 47 to 61, wherein the RC vehicle comprises an unmanned aerial vehicle (UAV), an unmanned terrestrial vehicle (UTV), or an unmanned marine vehicle (UMV).

Example 63 includes the system of any of Examples 47 to 62, comprising a display device to provide a user interface to display and/or receive user instructions.

Example 64 includes the system of Example 63, wherein the display device includes one or more of a desktop computer, a laptop computer, a smartphone, a tablet, and a wearable computing device.

Example 65 includes a computer program comprising a set of instructions, which, when executed by a computerized device, cause the computerized device to perform a method of monitoring and protecting a designated area, the method comprising: detecting an object traveling to a zone including scanning one or more frequencies of one or more radio frequency (RF) signals; analyzing at least one of time and frequency information of the one or more RF signals to characterize the detected object; and engaging the detected object as an authorized or unauthorized object in the zone.

Example 66 includes a computer program comprising a set of instructions, which, when executed by a computerized device, cause the computerized device to perform a method of monitoring radio control (RC) vehicles in a designated area, the method comprising: detecting a RC vehicle traveling in a predefined zone that communicates using a RC communications protocol, the detecting including: scanning a plurality of frequencies of one or more radio frequency (RF) signals, measuring RF power in one or more frequency bands of the scanned plurality of frequencies, and generating a temporal RF signature based at least in part on the measured RF power; and analyzing at least one of time and frequency information of the one or more RF signals to characterize one or more features of the detected RC vehicle, the analyzing including: determining a frequency hopping scheme of the RC communications protocol used by the RC vehicle, and determining a timing and an order of the frequency hopping scheme to produce an RC signature of the RC vehicle.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer include one or more processors for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for monitoring and protecting a designated area, the method comprising:
    detecting an object traveling to a zone by:
        scanning one or more frequency bands of one or more received radio frequency (RF) signals;
        mixing the one or more received RF signals with a local oscillator signal provided by a phase locked loop in order to generate a first intermediate frequency (IF) signal and a second IF signal, wherein the first IF signal and the second IF signal are out of phase;
        filtering the first IF signal and the second IF signal with a narrow-band filter to generate a first filtered IF signal in a first phase and second filtered IF signal in a second phase;
        amplifying the first filtered IF signal in the first phase and the second filtered IF signal in the second phase;
        generating, via an RF power detector, a first analog power signal for the first filtered IF signal in the first phase and a second analog power signal for the second filtered IF signal in the second phase;
        determining a first RF power for first filtered IF signal in the first phase based on the first analog power signal and a second RF power for second filtered IF signal in the second phase based on the second analog power signal;
        generating an RF signature based on the first RF power associated with the first filtered IF signal in the first phase and the second RF power associated with the second filtered IF signal in the second phase;
        comparing the RF signature to one or more known RC communication protocols;
        based on the comparing the RF signature to one or more known RC communication protocols, determining an RC communication protocol used by the object; and
    engaging the detected object by transmitting an interference signal in synchrony with the RC communication protocol of the object.

2. The method of claim 1, wherein the scanned one or more frequency bands include frequencies associated with one or more of 2.4 GHz, 6.2 GHz, 5.8 GHz, 1.3 GHz, 900 MHz, or 433 MHz radio frequency bands.

3. The method of claim 1, further comprising:
determining one or more frequencies used by the object; and
determining a frequency hopping scheme of the RC communications protocol used by the object.

4. The method of claim 3, further comprising: determining a timing and an order of the frequency hopping scheme to produce the RF signature of the object.

5. The method of claim 4, further comprising: comparing the signature of the object to one or more known signatures.

6. The method of Claim 3, wherein transmitting the interference signal includes transmitting the interference signal at a frequency and timing associated with the frequency hopping scheme of the RC communications protocol used by the object.

7. The method of claim 1, further comprising: seizing control of the detected object by injecting one or more data packets to control the object's travel.

8. The method claim 1, wherein the object comprises an unmanned aerial vehicle (UAV), an unmanned terrestrial vehicle (UTV), or an unmanned marine vehicle (UMV).

9. A system for protecting a territory from unauthorized drones, the system comprising:
one or more wireless signal detection units positioned around a designated area, each wireless signal detection unit comprising one or more antennas and being configured to:
receive radio frequency (RF) signal from a drone flying in a detection region included inside and/or outside the designated area;
scan one or more frequency bands of the one or more received radio frequency (RF) signals;
mix the one or more received RF signals with a local oscillator signal provide by a phase locked loop in order to generate a first intermediate frequency (IF) signal and a second IF signal, wherein the first IF signal, wherein the first IF signal and the second IF signal are out of phase;
filter the first IF signal and the second IF signal with a narrow-band filter to generate a first filtered IF signal in a first phase and a second filtered IF signal in a second phase;
amplify the first filtered IF signal in the first phase and the second filtered IF signal in the second phase;
generate, via an RF power detector, a first analog power signal for the first filtered IF signal in the first phase and a second analog power signal for the second filtered IF signal in the second phase;
determine a first RF power for a first filtered IF signal in the first phase based on the first analog power signal and a second RF power for second filtered IF signal in the second phase based on the second analog power signal;
generate an RF signature based on the first RF power associated with the first filtered IF signal in the first phase and the second RF power associated with the second filtered IF signal in the second phase; and
a data processing system in communication with the one or more wireless signal detection units, the data processing system comprising a memory comprising executable instructions and a processor configured to execute the instructions and cause the data processing system to:
receive an RF signature from at least one of the one or more wireless signal detection units;
compare the RF signature to one or more known RC communication protocols;
based on the comparing the RF signature to one or more known RC communication protocols, determine an RC communication protocol used by the drone; and
engage the detected from by causing an interference signal to be transmitted in synchrony with the RC communication protocol of the drone.

10. The system of claim 9, wherein the data processing system is further configured to detect a frequency hopping scheme.

11. The system of claim 9, further comprising: a display unit to interface with an operator of the system.

12. The system of claim 9, wherein at least one of the one or more antennas of each wireless signal detection units is a directional antenna.

13. The system of claim 9, wherein the drone communicates using a radio control (RC) communications protocol.

14. The system of claim 9, wherein the one or more wireless signal detection units and the data processing system are attached to a mobile vehicle.

15. The system of claim 9, wherein the one or more wireless signal detection units are attached to a mobile vehicle, and the data processing system is located in a fixed location in wireless communication with the one or more wireless signal detection units.

16. The system of claim 9, wherein the drone comprises an unmanned aerial vehicle (UAV), an unmanned terrestrial vehicle (UTV), or an unmanned marine vehicle (UMV).

17. A non-transitory, computer-readable medium comprising a set of instructions, which, when executed by a processor of a device, cause the device to perform a method of monitoring and protecting a designated area, the method comprising:
detecting an object traveling to a zone by:
scanning one or more frequencies of one or more radio frequency (RF) signals;
mixing the one or more received RF signals with a local oscillator signal provided by a phase locked loop in order to generate a first intermediate frequency (IF) signal and a second IF signal, wherein the first IF signal and the second IF signal are out of phase;
filtering the first IF signal and the second IF signal with a narrow-band filter to generate a first filtered IF signal in a first phase and a second filtered IF signal in a second phase;
amplifying the first filtered IF signal in the first phase and the second filtered IF signal in the second phase;
generating, via an RF power detector, a first analog power signal for the first filtered IF signal in the first phase and a second analog power signal for the second filtered IF signal in the second phase;
determining a first RF power for the first filtered IF signal in the first phase based on the first analog power signal and a second RF power for second filtered IF signal in the second phase based on the second analog power signal;
generating an RF signature based on the first RF power associated with the first filtered IF signal in the first phase and the second RF power associated with the second filtered IF signal in the second phase;
comparing the RF signature to one or more known RC communication protocols;

based on the comparing the RF signature to one or more known RC communication protocols, determining an RC communication protocol used by the object; and engaging the detected object by transmitting an interference signal in synchrony with the RC communication protocol of the object.

18. The computer-readable medium of claim 17, wherein the one or more received radio frequency (RF) signals is associated with a video transmission from the object.

19. The computer-readable medium of claim 17, wherein the interference signal is transmitted via a directional antenna.

20. The computer-readable medium of claim 18, wherein the method further comprises: receiving the one or more RF signals via one or more antennas tuned to frequencies associated with video transmission.

21. The computer-readable medium of claim 17, wherein comparing the RF signature to one or more known RC communication protocols comprises performing one of convolution or matched filtering.

22. The method of claim 1, wherein the first IF signal and the second IF signal are 90 degrees out of phase.

23. The method of claim 1, wherein the one or more received radio frequency (RF) signals is associated with a video transmission from the object.

24. The method of claim 1, wherein the interference signal is transmitted via a directional antenna.

25. The method of claim 23, further comprising: receiving the one or more RF signals via one or more antennas tuned to frequencies associated with video transmission.

26. The method of claim 1, wherein comparing the RF signature to one or more known RC communication protocols comprises performing one of convolution or matched filtering.

27. The system of claim 9, wherein the one or more received radio frequency (RF) signals is associated with a video transmission from the drone.

28. The system of claim 9, wherein in order to engage the detected drone, the data processing system is further configured to cause the interference signal to be transmitted via a directional antenna.

29. The system of claim 27, wherein the one or more wireless signal detection units are configured to receive the one or more RF signals via one or more antennas tuned to frequencies associated with video transmission.

30. The system of claim 9, wherein in order to compare the RF signature to one or more known RC communication protocols, the data processing system is further configured to perform one of convolution or matched filtering.

* * * * *